US011652963B2

(12) United States Patent
Vanbroekhoven et al.

(10) Patent No.: US 11,652,963 B2
(45) Date of Patent: May 16, 2023

(54) SOLID STATE LIGHT SOURCES ENABLING SPOKES WHEN USED WITH A COLOR WHEEL

(71) Applicant: SIGNIFY HOLDING B.V., Eindhoven (NL)

(72) Inventors: Vincent Vanbroekhoven, Mol (BE); Roelof Koole, Eindhoven (NL); Bart Alex Theresia Dilles, Vosselaar (BE); John-John Pieter Jan Van Den Bergh, Turnhout (BE)

(73) Assignee: SIGNIFY HOLDING B.V., Eindhoven (NL)

( * ) Notice: Subject to any disclaimer, the term of this patent is extended or adjusted under 35 U.S.C. 154(b) by 74 days.

(21) Appl. No.: 16/763,455

(22) PCT Filed: Nov. 13, 2018

(86) PCT No.: PCT/EP2018/081026
§ 371 (c)(1),
(2) Date: May 12, 2020

(87) PCT Pub. No.: WO2019/096764
PCT Pub. Date: May 23, 2019

(65) Prior Publication Data
US 2020/0366874 A1 Nov. 19, 2020

(30) Foreign Application Priority Data

Nov. 14, 2017 (EP) ..................................... 17201694

(51) Int. Cl.
*H04N 9/31* (2006.01)
*G02B 26/00* (2006.01)
(Continued)

(52) U.S. Cl.
CPC ......... *H04N 9/3117* (2013.01); *G02B 26/008* (2013.01); *G03B 21/204* (2013.01);
(Continued)

(58) Field of Classification Search
None
See application file for complete search history.

(56) References Cited

U.S. PATENT DOCUMENTS 5,967,636 A 10/1999 Stark et al.
6,252,636 B1 * 6/2001 Bartlett ............... H04N 9/3114
348/743

(Continued)

FOREIGN PATENT DOCUMENTS

CN 102645822 A 8/2012
CN 102971672 A 3/2013
(Continued)

*Primary Examiner* — Brian P Yenke
*Assistant Examiner* — Sean N. Haiem

(57) ABSTRACT

The invention provides a system (1000) for processing light, the system (1000) configured to provide along a main beam path (1105) a beam (1005) of system light (1001), wherein the system light (1001) comprises one or more of first light (111) having a first spectral distribution, second light (121) having a second spectral distribution, and third light (131) having a third spectral distribution, wherein the first, second, and third spectral distributions mutually differ, wherein the system (1000) comprises: —a lighting arrangement (100) configured to provide along a first beam path (1101) a first beam (101) comprising primary light (103) having a spectral power distribution with at least 80% of the spectral power consisting of one of the first light (111), the second light (121), and the third light (131), and/or configured to provide along a second beam pat (1102) a second beam (102) comprising composed light (104) having a spectral distribution with at least 80% of the spectral power consisting of the two others of the first light (111), the second light (121), (Continued)

and the third light (131); —an optical filter system (200) comprising a plurality of segments (210), wherein two or more segments (210) have different transmission characteristics for one or more of the primary light (103) and the composed light (104); wherein during operation of the system (1000) the optical filter system (200) is configured to have the segments (210) of the plurality of segments (210) sequentially intercept the main beam path (1105) or the second beam path (1102), wherein during a time period (tsp) the beam path (1105, 1102) is partially intercepted by a first segment (211) and partially intercepted by a second segment (212); —a control system (300) configured to control the lighting arrangement (100) and the optical filter system (200) such that during at least part of the time period (tsp) at least 80% of a spectral power distribution of the system light (1001) of the beam (1005) of system light (1001) consists of the primary light (103).

14 Claims, 9 Drawing Sheets

(51) Int. Cl.
  *G03B 21/20* (2006.01)
  *G03B 33/08* (2006.01)
(52) U.S. Cl.
  CPC ........... *G03B 21/206* (2013.01); *G03B 33/08* (2013.01); *H04N 9/3158* (2013.01); *H04N 9/3164* (2013.01)

(56) References Cited

U.S. PATENT DOCUMENTS

| | | | |
|---|---|---|---|
| 6,324,006 B1 | 11/2001 | Morgan | |
| 6,398,389 B1 | 6/2002 | Bohler et al. | |
| 6,567,134 B1 | 5/2003 | Morgan | |
| 9,624,426 B2 | 4/2017 | Peeters et al. | |
| 2005/0270775 A1 | 12/2005 | Harbers et al. | |
| 2005/0280785 A1* | 12/2005 | Beeson | H04N 9/315 353/97 |
| 2006/0238717 A1* | 10/2006 | Maximus | G03B 33/08 353/30 |
| 2007/0035703 A1 | 2/2007 | Hoffman | |
| 2009/0244923 A1 | 10/2009 | Hofmann et al. | |
| 2010/0182353 A1 | 7/2010 | Roth et al. | |
| 2010/0283977 A1* | 11/2010 | Wang | G03B 21/204 353/84 |
| 2010/0315604 A1 | 12/2010 | Peeters et al. | |
| 2010/0328554 A1* | 12/2010 | Shibasaki | H04N 9/3161 315/312 |
| 2013/0114049 A1* | 5/2013 | Li | H04N 9/3117 353/84 |
| 2014/0211170 A1* | 7/2014 | Kitano | H04N 9/3161 353/31 |
| 2015/0062908 A1 | 3/2015 | Choi et al. | |
| 2015/0146100 A1 | 5/2015 | Saitou et al. | |
| 2015/0316840 A1* | 11/2015 | Maeda | G03B 21/2013 353/31 |
| 2016/0165194 A1 | 6/2016 | Hartwig et al. | |
| 2019/0235369 A1* | 8/2019 | Janssens | G03B 21/005 |

FOREIGN PATENT DOCUMENTS

| | | |
|---|---|---|
| CN | 104871085 A | 8/2015 |
| CN | 106483749 A | 3/2017 |
| EP | 1615449 A1 | 1/2006 |
| EP | 2787390 A1 | 10/2014 |
| JP | 4049755 B2 | 9/2005 |
| JP | 2011191602 A | 9/2011 |
| JP | 2014525653 A | 9/2014 |
| JP | 2014240912 A | 12/2014 |
| JP | 2017003643 A | 1/2017 |
| WO | 2006054203 A1 | 5/2006 |
| WO | 2007122543 A1 | 11/2007 |
| WO | 2008056296 A1 | 5/2008 |
| WO | 2009069010 A1 | 6/2009 |
| WO | 2014104385 A1 | 7/2014 |
| WO | 2016075014 A1 | 5/2016 |
| WO | 2016177570 A1 | 11/2016 |
| WO | 2017097762 A1 | 6/2017 |
| WO | 2017102439 A1 | 6/2017 |
| WO | 2017157742 A1 | 9/2017 |

\* cited by examiner

SOLID STATE LIGHT SOURCES ENABLING SPOKES WHEN USED WITH A COLOR WHEEL

CROSS-REFERENCE TO PRIOR APPLICATIONS

This application is the U.S. National Phase application under 35 U.S.C. § 371 of International Application No. PCT/EP2018/081026, filed on Nov. 13, 2018, which claims the benefit of European Patent Application No. 17201694.1, filed on Nov. 14, 2017. These applications are hereby incorporated by reference herein.

FIELD OF THE INVENTION

The invention relates to a system for processing light as well as a method for processing light (with such system). The invention also relates to a computer program product, such as for executing such method. Yet, the invention also relates to a projection system or a luminaire comprising the system (for processing light).

BACKGROUND OF THE INVENTION

Illumination systems for projection devices are known per se. They are used, inter alia, in projection devices such as beamers and projection televisions. In such an image projection system, the light generated in the illumination system impinges on an image creation unit, for example, a Liquid Crystal Display (further also indicated as LCD) or, for example, a Digital Light Processing unit (further also indicated as DLP) or, for example, a Liquid Crystal on Silicon (further also indicated as LCoS) after which the image is projected on to a screen or wall. The illumination systems for projection devices typically emit light in a sequence of colors of light which is repeated over time. Each of the subsequent colors of light is used in the projection device to generate a partial image. The image is generated by subsequently superposing the partial images on the screen. The quality of such an image projection device is often indicated by the brightness of the image which can be produced. One way of emitting the sequence of colors of light by the known illumination system is by using a color wheel. The color wheel is generally arranged between a light source of the illumination system and a light output window of the illumination system. The color wheel comprises a plurality of color segments which determine the sequence of colors of the light emitted by the illumination system by sequentially positioning color segments from the plurality of color segments between the light source and the light output window.

A drawback when using the color wheel having a plurality of color segments is that the color of the light emitted by the known illumination system constantly changes during a so called spoke time.

One way of overcoming constant changing of the color during the spoke time is to simply switch off the light source during a spoke time. However, switching off the light during the spoke time reduces the brightness of the illumination system which is very undesirable for projection devices. So, alternative illumination systems have been developed to optimally use the light which is emitted during the spoke time. For example, the US patent application US2007/0035703 provides a system for actively compensating for the spoke light. The cited US patent application improves the technique known as spoke light recovery (SLR) which may be employed to use light generated during spoke times. The known illumination system comprises a light source configured to generate a first light level during a non-spoke time of a color wheel. The system further comprises a photodiode assembly configured to measure the first light level to generate a non-spoke light level. A processor is configured to set a spoke light compensation value based on the non-spoke light level. The light generated during the spoke time for a particular pixel is employed if the shade of that particular pixel includes a red, green and blue light level that are each above a threshold. Further, to facilitate smoother transition between non-SLR and SLR and vice versa, the video unit may be configured to subtract some portion of the light generated during the non-spoke times to compensate for the additional light output during the spoke times. This compensation factor is referred to as the spoke time compensation value.

EP2787390A1 discloses a projection apparatus which includes at least two solid state light sources, a sync signal generator and a controller. The at least two solid state light sources are used to directly or indirectly generate at least two primary color light of different color and output alternately. The sync signal generator is used for generating a sync signal, and the controller for supplying a drive power to each solid state light sources based on the sync signal in pulse manner. During at least one sub-period, one of the two solid state light sources is in working status and the other one is in an inactive status.

WO2014/104385A1 discloses a light source device comprising: a light source section which generates any one of blue light, red light, and green light; a phosphor which generates a fluorescence including the two colors other than the color of the light emitted from the light source section; a color-changing section which changes one of the two colors of the fluorescence emitted from the phosphor to another color regularly and irradiates it to the image-forming element; and a light path-switching section which switches a light path in which a fluorescence excited by the color light emitted from the light source section passes towards the color-changing section and a light path in which the color light emitted from the light source section passes towards the image-forming element regularly.

U.S. Pat. No. 6,398,389B1 discloses a solid state light source augmentation for SLM display systems. In an SLM-type display system, a solid state light source can be used to augment a lamp light source in a least two different ways. First, a solid state source can be used to augment deficiencies in a particular spectral region. Typically, lamps are deficient in red, and a red solid state source would be used. However, the same concept applies to augmenting any color region. Multiple solid state sources could be used to augment more than one region. Second, when the SLM system uses a color wheel, a solid state source can be used to eliminate "spoke loss". Multiple solid state sources can be used for providing different colors during the spokes.

US2010/283977A1 discloses an illumination system adapted to a projection apparatus, including a light source module, a light color modulating module, and a control unit. The light color modulating module has a plurality of light color modulating units and is disposed in a transmission path of a light beam. The light color modulating module is capable of moving so that the light color modulating units move into the illumination region of the light beam. When the control unit determines that a boundary of any two adjacent light color modulating units has moved into the illumination region of the light beam, the control unit switches the light source module to an off-state. When the boundary of any two adjacent light color modulating units has moved away from the illumination region of the light beam, the control unit switches the light source module to an on-state.

SUMMARY OF THE INVENTION

The currently available DLP (Digital Light Processing) color wheels for lamp and/or SSI (solid state illumination; sometimes also indicated as SSL, which refers to solid state lighting) based projectors consist of a few (typically three to eight) color filter segments. These color filter segments can be red, green, blue, yellow, cyan, magenta and/or white (i.e. transparent), and are meant to filter out the required color out of a light source, which emits a broad(er) spectrum. One of the main disadvantages of this principle is that 'undefined' light is emitted at the transition area between the different color segments. These areas on the color wheel are commonly referred to as (conventional) spokes (CSP). Typically, conventional spokes take away 12°-18° from each color segment on the color wheel. The exact amount is determined by the size of the light spot onto the color wheel. In applications were (essentially) no overlap (of colors) is allowed (e.g. video mode), light emitted in conventional spokes cannot be used and is lost (as the light is not provided during the spoke time).

In applications were overlap is allowed (e.g. data or bright mode), light emitted in conventional spokes can be used as an overlap segment.

Another disadvantage of currently available systems using a color wheel is that they are very limited in flexibility. A color wheel which is defined for applications that allow overlap (e.g. data, education, . . . ) cannot be used for applications that do not allow overlap (e.g. video). What is often seen nowadays is that brands release different versions of their application to target specific application areas. Another option would be to work with interchangeable color wheels. However, none of these options are cost friendly or user friendly. This conventional design of color wheels is related to the fact that current (ultra-high pressure, "UHP") lamps used for projection are broad-spectrum light sources that cannot be switched on/off with high frequency and accuracy (as is the case for SSL light sources). Even for SSL-based projectors, the flexibility of a conventional color wheel design is limited: the duty cycle of each color is fixed by the size of each color segment. For various modes typically offered by projectors, the balance between red, green, blue, white, and other colors may also vary a lot. In practice, even for SSL based projectors, it means a color wheel is typically optimized for a certain mode (e.g. color or video mode), implying a compromise on the efficiency or brightness in the other modes (such as bright or data mode).

Hence, it is an aspect of the invention to provide an alternative system for processing light and/or an alternative method for processing light, which preferably further at least partly obviate(s) one or more of above-described drawbacks. The present invention may have as object to overcome or ameliorate at least one of the disadvantages of the prior art, or to provide a useful alternative.

Amongst others, the invention provides a design and/or configuration of a DLP color wheel and ways to operate such color wheel. Especially, the system is controlled such, that during a substantial part of the spoke time only light is provided that is not to be filtered in the filter segments which alternatingly intercept an optical path (herein also indicated as beam path) and which together with the light source(s) and optional optics create the spoke time. For instance, the DLP color wheel design may be changed to embodiments wherein the color wheel may consist of (as many as possible) color wheel segments, which are (all) transparent for blue light (such as cyan, magenta, white and/or blue segments). This allows the designer to create multiple sequences with varying duty cycle settings without the need of changing the color wheel itself. This may especially be relevant for blue, but may also be applied for one of the other primary colors.

Further, amongst others the invention provides a new way to operate the color wheel in combination with (SSI) light sources. In embodiments, the blue light source can be turned on during each color wheel segment, which is transparent for blue light. This opens up the possibility to cancel out (some of) the conventional spokes and thus significantly reduces light losses. These conventional spokes can be cancelled out by turning on the blue light source during as many as possible of these conventional spokes (i.e. during the transition from one segment to the other). Colors can be toggled outside the conventional spoke areas by almost instantaneously switching on and off the different SSI light sources, which we will refer to as a digital spoke from here on. Because the switching time between different light sources is extremely fast, the light losses are almost negligible compared to the conventional spokes losses. This may especially be relevant for blue, but may also be applied for one of the other primary colors.

Hence, in a first aspect the invention provides a system for processing light, the system configured to provide along a main beam path a beam of system light, wherein the system light comprises one or more of first light having a first spectral distribution, second light having a second spectral distribution, and third light having a third spectral distribution, wherein the first, second, and third spectral distributions mutually differ, wherein the system comprises:

a lighting arrangement (or "lighting system") comprising one or more solid state light sources and configured to provide along a first beam path a first beam comprising primary light having a spectral power distribution with at least 60%, especially at least, 80%, such as even more especially at least 90%, such as yet even more especially about 100% of the spectral power consisting of one of the first light, the second light, and the third light, and/or configured to provide along a second beam path a second beam comprising composed light having a spectral distribution with at least 60%, especially at least, 80%, such as even more especially at least 90%, such as yet even more especially about 100% of the spectral power consisting of the two others of the first light, the second light, and the third light;

an optical filter system comprising a plurality of segments, wherein two or more segments have different transmission characteristics for one or more of the primary light and the composed light; wherein during operation of the system the optical filter system is configured to have the segments of the plurality of segments sequentially intercept the main beam path or the second beam path, wherein during a time period (tsp) the beam path is partially intercepted by the first segment and partially intercepted by the second segment;

a control system (or "controller") configured to control the lighting arrangement and the optical filter system such that during the time period (tsp) at least 60%, especially at least, 80%, such as even more especially at least 90%, such as yet even more especially about 100% of a spectral power distribution of the system light of the beam of system light consists of the primary light.

With such system (and/or method, see also below), it may be possible to increase the flexibility of creating various duty cycle sequences without the need of changing the color wheel itself. Further, with such system (and/or method, see also below), it may be possible to significantly reduce light losses due to conventional spokes by using the ability of the SSI light source of switching on and off (almost) instantaneously. Controlling the light with the control system may be much faster than controlling with an optical filter system, such as one comprising a color wheel. Hence, the kind of analog problem of an optical filter system, such as one using a color wheel, is herein essentially digitally solved by controlling during the spoke time the intensity of the composed light (which is essentially low, or off) and the intensity of the primary light, and toggling between the primary and composed light outside of the spoke region in a digital and hence much faster way. Such system may be used for displaying a full-color image. The term "full-color", like in the term "full-color projection system" herein implies that the system is able to provide full-color projection or lighting. However, this does not exclude that the system may be able to provide in one or more control modes white light and/or in one or more other control modes a single color, etc. The term "image" may also refer to a plurality of different images, like in a movie. The image may contain one or more of a concrete image, an abstract image, a pattern, text, a number, etc. The display system may be used to display an image on a screen. However, the system may also be used to display in image on an (other) object or on a human. Alternatively or additionally, such system may be used for lighting, such as general lighting. For instance, the system may be used for stage lighting, but may also be used for general lighting. Note that in embodiments of the system, the system may be used in a mode for (general) lighting and at another time in a mode for projection of images. In both embodiments, the light that is generated with the lighting arrangement may be processed with the system and/or method to provide the general lighting or image(s).

As indicated above, the invention provides a system for processing light. Especially, the processing of the light is applied for providing different types of light, especially different types of light in time, and providing to a spatial light modulator ("SLM") that can provide a pixelated image. Over time, with a relative high frequency, pixelated images may be provided, which are superimposed by the human eye. For instance, when with a frequency of about 60 Hz or higher red light is provided, this will be perceived as red light, and when with such frequency or higher alternatingly red light of 620 nm and green light of 545 nm is provided, this may be perceived as yellow(ish) light (dependent upon the intensity (over time)). The term "spatial light modulator" may also refer to a plurality of (different) spatial light modulators.

Hence, the present invention may be used in systems that use the DLP technology (which was at least partly developed by TI). DLP, or digital light processing, uses a matrix of tiny mirrors to reflect light toward the screen (an "on" pixel) or away (an "off" pixel). Hence, the system may use a DLP mirror chip, which includes a reflective surface made up of thousands (or millions) of controllable tiny mirrors. Each mirror represents a single pixel. In a DLP projector, light from light source is directed onto the surface of the DLP mirror chip. The mirrors tilt back and forth, directing light either into the lens path to turn the pixel on, or away from the lens path to turn it off. This may happen with a high frequency, such that the human eye does not essentially see the periodic changing color but experience a singly type of light (from the respective pixel(s)). The mirror chip may also be indicated as DMD (digital mirror device). Hence, in embodiments the spatial light modulator system is multi micro-mirrors based. The present invention may also be used in an LCoS (liquid crystal on silicon) based system. Such LCoS based system may be considered a kind of a hybrid between LCD and DLP. It uses liquid crystal chips with a mirrored backing. So they are reflective, like DLP, but also may block light using liquid crystal, like LCDs. Systems based on other (SLM) principles may also be used. As indicated above, the term "SLM" may also refer to a plurality of (different) SLMs. The combination of lighting system and SLM(s) is configured to project the image. The (three) light sources (see also below) may essentially provide the light that is necessary for the image of lighting of the projection system. Hence, the lighting system may also be indicated as "full-color lighting system". As indicated above, however, the system further comprises a further light source. This further light source may be less essential for the image, but may especially allow special effects in the sense that an object receiving light of the further light source may seem brighter.

The image (or light for general lighting) is provided with a beam of system light. Hence, the beam of system light escapes, during use of the system, from the system, and may be directed to a screen, a wall, an object, a wall, etc. The system may e.g. comprise an end window, such as a lens, where the beam of system light escapes from the system. Upstream of the window (or lens-shaped window), there may be an essentially closed unit, wherein the lighting arrangement and optical filter system, and optionally further optics, may be arranged. The window may thus be configured as window of such essentially closed unit. Here, the term "window" refers to a light transparent solid material, like a glass window, such as a lens. Instead of the term "window" also terms like "light exit window" or "light output window" may be applied. The term "window" may also refer to a plurality of (different) windows.

The terms "upstream" and "downstream" relate to an arrangement of items or features relative to the propagation of the light from a light generating means (here the especially the light source), wherein relative to a first position within a beam of light from the light generating means, a second position in the beam of light closer to the light generating means is "upstream", and a third position within the beam of light further away from the light generating means is "downstream".

The system is configured to provide along a main beam path a beam of system light. The system light may comprise one or more of first light having a first spectral distribution, second light having a second spectral distribution, and third light having a third spectral distribution, wherein the first, second, and third spectral distributions mutually differ. Different colors may be used to generate the light, but the first, second and third light may especially refer to essentially blue, green, and red light, respectively. However, the fact that three types of light are applied, does not exclude the use of one or more further types of light. Herein, embodiments wherein three types of (primary) light are used are discussed, but the invention is not limited to such embodiments. The contribution of the types of light to the system light may vary in time as the system light that escapes from the system may vary in time, e.g. due to the fact that different images are projected. For instance, sequentially differently colored images are projected together with the SLM with such a frequency that the human eye combines these images to see the colors of the original image that is projected. It is herein also not excluded that system light in the beam of system light may also comprise a combination of two or more types of light at the same time. d. Hence, in embodiments the lighting arrangement may be configured to generate the first beam and the second beam alternatingly.

The beam of system light follows a path of light within the system, which path may also be indicated as "light path" or "optical path" or "beam path". Hence, the beam path is the route the system light of the beam of system light may follow within the system, especially within such closed unit (see above). The beam of system light is herein especially indicated as "main beam" or "main beam of system light". The main beam may be a beam downstream of one or more combination locations, where two or more other beams are combined into a single beam. For example, the first beam, which is provided along a first beam path, may be combined with the second beam, which is provided along a second beam path, by using light combining optics to combine the first beam and the second beam.

Likewise, the other beams, like the first beam or primary beam or the second beam or composed beam, follow beam paths. The optical path or beam path is not tangible, but especially refers to the path that light takes in traversing an optical medium or system.

As the beam of system light may in embodiments effectively be consecutive beams of different types of light (or different combinations of different types of light), more precisely it may be defined that the main beam path may be a beam path downstream of one or more combination locations, where two or more other beam paths are combined into a single beam path. For instance, a light source generating blue light and a light source generating yellow light may be used, and the light thereof may be combined to generate a single beam of light that at the same time or sequentially comprises both types of light, but following the same beam path. In such example, a beam path of the (light of the) light source generating blue light and a beam path of the (light of the) light source generating yellow light are combined at a combination location into a combined beam path.

As indicated above, the system comprises a lighting arrangement. The term "lighting arrangement" may refer an arrangement comprising one or more light sources, especially a plurality of light sources that is (are) configured to generate light, herein especially a plurality of beams of light. The invention is especially related to a solution wherein the light of a beam of light comprises two or more different types of light that has to be converted in a beam of essentially one type of light. Hence, the lighting arrangement may be configured to generate a beam of composed light including two or more different colors. Further, the lighting arrangement may especially be configured to generate also a beam of essentially a single color.

Therefore, the system may thus comprise a lighting arrangement configured to provide along a first beam path a first beam comprising primary light having a spectral power distribution with at least 60% of the spectral power consisting of one of the first light, the second light, and the third light, and/or configured to provide along a second beam path a second beam comprising composed light having a spectral distribution with at least 60% of the spectral power consisting of the two others of the first light, the second light, and the third light.

Therefore, the first beam of light may essentially consist of one type of (primary) light, such as blue, green, or red. This is indicated with the feature that the first beam of primary light has a spectral power distribution with at least 60% of the spectral power consisting of one of the first light, the second light, and the third light. Even more especially, at least, 80%, such as even more especially at least 90%, such as yet even more especially about 100% of the spectral power consists of one of the first light, the second light, and the third light. Herein, especially the primary beam of light may essentially consist of the first light. In specific embodiments, the primary beam of light may essentially consist of blue light. The first beam of light may also be indicated as "primary beam".

However, the second beam of light especially comprises (two or more of) those colors which are not included in the light of the first beam. The second beam of light may also be indicated as "composed beam". Hence, the second beam comprises composed light having a spectral distribution with at least 60% of the spectral power consisting of the two others of the first light, the second light, and the third light. Even more especially, at least 80%, such as even more especially at least 90%, such as yet even more especially about 100% of the spectral power consists of the two others of the first light, the second light, and the third light.

For instance, the first beam of light may comprise blue light and the second beam of light may comprise yellow light.

As can be derived from the above, the phrase "at least 60% of the spectral power consisting of the two others of the first light, the second light, and the third light" and similar phrases may thus also refer to with at least 60% of the spectral power consisting of two or more of the two or more others of the first light, the second light, and the third light.

In further embodiments, the term "second beam of light" may also refer to two or more different second beams, which each comprise composed light of different compositions. For instance, the composed beam of light may include yellow light. In other embodiments, a composed beam may include orange light and another composed beam comprises yellow light.

For instance, in embodiments the system, more especially the lighting arrangement, may comprise (i) a first light source configured to generate primary light and (ii) a second light source configured to generate the composed light.

In embodiments, the lighting arrangement may be configured to generate one two or more of the first light, the second light and the third light with essentially a single lighting device, wherein two or more of the types of light may be offered sequentially. Hence, in embodiments the system, more especially the lighting arrangement, may comprise a light source configured to generate primary light and the composed light, wherein the primary light and the composed light may be offered sequentially.

Such systems may in embodiments comprise an operation mode wherein the different types of light are offered always sequentially. However, such systems may in embodiments also comprise two or more operation modes, with for instance an operation mode wherein the primary light and the composed light may be offered sequentially, and an operation mode wherein two or more different types of light may be offered simultaneously. For instance, in an embodiment the primary light and the composed light may also be offered in operation modes simultaneously. For the purpose of this invention however, such systems at least comprise an operation mode wherein two or more different types of light may be provided alternatingly, but wherein during one or more periods also two or more types of light form composed light, and wherein during one or more other periods also primary light is provided.

In such embodiments, the first beam path and the second beam path may thus over at least part of their path length essentially coincide.

Therefore, in further embodiments the lighting arrangement is configured to alternatingly provide along a first beam path a first beam comprising primary light (especially having a spectral power distribution with at least 60%, especially at least, 80%, such as even more especially at least 90%, such as yet even more especially about 100% of the spectral power consisting of one of the first light, the second light, and the third light), and/or configured to provide along a second beam path a second beam comprising composed light (especially having a spectral distribution with at least 60%, especially at least, 80%, such as even more especially at least 90%, such as yet even more especially about 100% of the spectral power consisting of the two others of the first light, the second light, and the third light), wherein over at least part of the path length the first beam path and the second beam path coincide. Hence, in embodiments the lighting arrangement may be configured to generate the first beam and the second beam alternatingly.

In embodiments, the first light source comprises a solid-state light source. In embodiments, the first light source comprises a blue solid-state light source, such as a blue light emitting diode. In embodiments, the second light source comprises a pump light source configured to generate pump light source light and a luminescent material configured to convert at least part of the pump light source light into luminescent material light, wherein the composed light comprises the luminescent material light. The pump light source may also be a solid-state light source, such as a blue light emitting diode. Hence, in embodiments the first light source comprises a solid-state light source, and the second light source comprises a solid-state light source.

The luminescent material may especially be a trivalent cerium based luminescent material, such as a cerium doped garnet, which is known in the art (such as e.g. described in WO2006/054203 or U.S. Pat. No. 9,624,426B2 or J. M. Robertson et al., Philips Journal of Research 36, 1981, p. 15-30, which are herein incorporated by reference). Such materials may convert the pump light into light having colors in the range of green, yellow, orange and red, and in many embodiments of these garnets always a combination of green and (some) red. As known in the art, YAG:$Ce^{3+}$ based systems may have emissions that shift more to the red when Y is at least partly substituted by e.g. gadolinium or lanthanum, but the emission shifts more to the blue when yttrium is at least partly substituted by lutetium. Also at least partly substituting aluminum for one or more of gallium, indium and scandium shifts the luminescence to the blue. In this way, with choosing the dodecahedral ($Y^{3+}$) site type cations and/or the octahedral ($Al^{3+}$) site type anions, the desired emission may be chosen. However, essentially none of these emissions are purely a primary color, due to the relative large bandwidth.

In embodiments, the invention provides a system for processing light, the system configured to provide along a main beam path a beam of system light, wherein the system light comprises one or more of first light having a first spectral distribution, second light having a second spectral distribution, and third light having a third spectral distribution, wherein the first, second, and third spectral distributions mutually differ, wherein the system comprises: a lighting arrangement configured to provide along a first beam path a first beam comprising primary light having a spectral power distribution with at least 80% of the spectral power consisting of one of the first light, the second light, and the third light; an optical filter system comprising a plurality of segments, wherein two or more segments have different transmission characteristics for one or more of the primary light and the composed light; wherein during operation of the system the optical filter system is configured to have the segments of the plurality of segments sequentially intercept the main beam path, wherein during a time period tsp the main beam path is partially intercepted by a first segment and partially intercepted by a second segment; a control system configured to control the lighting arrangement and the optical filter system such that during the time period tsp at least 80% of a spectral power distribution of the system light of the beam of system light consists of the primary light.

In embodiments, the invention provides a system for processing light, the system configured to provide along a main beam path a beam of system light, wherein the system light comprises one or more of first light having a first spectral distribution, second light having a second spectral distribution, and third light having a third spectral distribution, wherein the first, second, and third spectral distributions mutually differ, wherein the system comprises: a lighting arrangement configured to provide along a first beam path a first beam comprising primary light having a spectral power distribution with at least 80% of the spectral power consisting of one of the first light, the second light, and the third light, and configured to provide along a second beam path a second beam comprising composed light having a spectral distribution with at least 80% of the spectral power consisting of the two others of the first light, the second light, and the third light; an optical filter system comprising a plurality of segments, wherein two or more segments have different transmission characteristics for one or more of the primary light and the composed light; wherein during operation of the system the optical filter system is configured to have the segments of the plurality of segments sequentially intercept the main beam path, wherein during a time period tsp the main beam path is partially intercepted by a first segment and partially intercepted by a second segment; a control system configured to control the lighting arrangement and the optical filter system such that during the time period tsp at least 80% of a spectral power distribution of the system light of the beam of system light consists of the primary light.

In embodiments, the invention provides a system for processing light, the system configured to provide along a main beam path a beam of system light, wherein the system light comprises one or more of first light having a first spectral distribution, second light having a second spectral distribution, and third light having a third spectral distribution, wherein the first, second, and third spectral distributions mutually differ, wherein the system comprises: a lighting arrangement configured to provide along a first beam path a first beam comprising primary light having a spectral power distribution with at least 80% of the spectral power consisting of one of the first light, the second light, and the third light, and configured to provide along a second beam path a second beam comprising composed light having a spectral distribution with at least 80% of the spectral power consisting of the two others of the first light, the second light, and the third light; an optical filter system comprising a plurality of segments, wherein two or more segments have different transmission characteristics for one or more of the primary light and the composed light; wherein during operation of the system the optical filter system is configured to have the segments of the plurality of segments sequentially intercept the second beam path, wherein during a time period tsp the second beam path is partially intercepted by a first segment and partially intercepted by a second segment; a control system configured to control the lighting arrangement and the optical filter system such that during the time period tsp at least 80% of a spectral power distribution of the system light of the beam of system light consists of the primary light.

In embodiments, the lighting arrangement is configured to provide along a first beam path a first beam comprising primary light having a spectral power distribution with at least 80% of the spectral power consisting of one of the first light, the second light, and the third light. For example, the first light, the second light, and the third light may be offered sequentially e.g. in a repeating sequence e.g. first light—second light—third light—first light—second light—third light etc.

In embodiments, the lighting arrangement is configured to provide along a first beam path a first beam comprising primary light having a spectral power distribution with at least 80% of the spectral power consisting of first light, and configured to provide along a second beam path a second beam comprising composed light having a spectral distribution with at least 80% of the spectral power consisting of the second light and the third light.

In embodiments, the lighting arrangement is configured to provide along a first beam path a first beam comprising primary light having a spectral power distribution with at least 80% of the spectral power consisting of second light, and configured to provide along a second beam path a second beam comprising composed light having a spectral distribution with at least 80% of the spectral power consisting of the first light and the third light.

In embodiments, the lighting arrangement is configured to provide along a first beam path a first beam comprising primary light having a spectral power distribution with at least 80% of the spectral power consisting of third light, and configured to provide along a second beam path a second beam comprising composed light having a spectral distribution with at least 80% of the spectral power consisting of the first light and the second light.

In embodiments, the lighting arrangement comprises one or more solid state light sources and a luminescent material, wherein the luminescent material is configured to convert at least part of the light of the solid-state light sources. In specific embodiments, the lighting arrangement is configured to provide spectrally tunable light. Hence, in embodiments the lighting arrangement may be configured to provide different modes one or more of the primary light and the composed light. For instance, a plurality of different luminescent materials may be applied and/or a plurality of solid state light sources may be applied. This may allow providing a single beam path with light which may vary in time in spectral composition, i.e. either primary light or composed light, and in specific embodiments also one or more modes light wherein a combination of the primary light and the composed light may be provided.

In embodiments, the lighting arrangement comprises a light emitting device as defined in e.g. WO2006/054203, which is herein incorporated by reference. For instance, the lighting arrangement may comprise at least one LED which emits light in the wavelength range of >220 nm to <550 nm and at least one conversion structure placed towards the at least one LED without optical contact, which converts at least partly the light from the at least one LED to light in the wavelength range of >300 nm to ≤1000 nm, especially wherein the at least one conversion structure has a refractive index n of >1.5 and <3 and the ratio A:E is >2:1 and <50000:1, where A and E are defined as follows: the at least one conversion structure comprises at least one entrance surface, where light emitted by the at least one LED can enter the conversion structure and at least one exit surface, where light can exit the at least one conversion structure, each of the at least one entrance surfaces having an entrance surface area, the entrance surface area(s) being numbered $A_i \ldots A_n$ and each of the at least one exit surface(s) having an exit surface area, the exit surface area(s) being numbered $E_1 \ldots E_n$ and the sum of each of the at least one entrance surface(s) area(s) A being $A=A_i+A_2 \ldots +A_n$ and the sum of each of the at least one exit surface(s) area(s) E being $E=E_i+E_2 \ldots +E_n$. Other examples may e.g. be derived from WO2017157742, WO2017102439, WO2017097762, WO2016177570, WO2016075014, US2009244923, WO2008056296, or WO2007122543, which are each individually incorporated herein by reference. The light sources used may in embodiments especially be (solid state) laser light sources.

In embodiments, the lighting arrangement comprises a (solid state) laser light source, and/or another light source, and a phosphor wheel, wherein the phosphor wheel comprises different luminescent materials (at spatially different positions at the color wheel) configured to convert at least part of the light generated by the solid state) laser light source, and/or another light source, wherein the light arrangement is configured to provide different types of light sequentially, with rotation of the color wheel. The use of phosphor color wheels is known in the art, and is e.g. described in US2015146100 or US20050270775, which are each individually incorporated herein by reference.

Therefore, in embodiments the lighting arrangement may comprise one or more solid state light sources, such as a LED and/or a laser, for generating one or more of the first light, the second light, and the third light, optionally with the use of one or more (different) luminescent materials.

However, in principle also the primary light may be generated on the basis of a luminescent material. Therefore, in embodiments the lighting arrangement may comprise a first solid-state light source, optionally optically coupled to a luminescent material, configured to generate the primary light.

The lighting arrangement may provide the primary light and the composed light simultaneously or sequentially. This may also vary in time, e.g. as function of the (color) composition of the image (in time). Therefore, in embodiments during operation system light of the beam of system light may comprise simultaneously or sequentially the primary light and the composed light.

As at least one of the beams of light includes composed light, and as it is desirable to be able to also choose the two (or more) individual primary colors of which the composed beam of light is composed, an optical filter system is applied. This optical filter system is especially configured to select during a specific period during operation one of the primary colors and essentially filter out one or more of the other colors. Especially, during a specific period during operation essentially only a single primary color from the light of the composed beam of light may pass the optical filter system.

In embodiments, the lighting arrangement may be configured to provide at spatially different locations two or more different beams of primary light. Alternatively or additionally, in embodiments, the lighting arrangement may be configured to provide at spatially different locations two or more different beams of composed light. In general, however, there will be single first beam path and a single second beam path. Therefore, in specific embodiments the lighting arrangement is configured to provide a single primary or first beam of light and a single second or composed beam of light.

As indicated above, the lighting arrangement may also be configured to provide at (essentially) the same location(s) the primary light and the composed light, but in one or more specific embodiments not at the same time, such as sequentially.

Hence, the system may further comprise an optical filter system comprising a plurality of segments, wherein two or more segments have different transmission characteristics for one or more of the primary light and the composed light; wherein during operation of the system the optical filter system is configured to have the segments of the plurality of segments sequentially intercept the main beam path or the second beam path, wherein during a time period (tsp or spoke time) the beam path is partially intercepted by the first segment and partially intercepted by the second segment.

The optical filter system is especially explained in relation to two segments that have different transmission characteristics, and which may sequentially be illuminated by primary light and/or composed light.

The optical filter system is especially explained in relation to two or more segments that have different transmission characteristics.

The optical filter system comprising a plurality of segments, wherein two or more segments have different transmission characteristics for white light. This means that white light which impinges on the first segment is transmitted by the first segment as first transmitted light. The same white light which impinges on the second segment is transmitted by the second segment as second transmitted light. The color point of the first transmitted light is different from the color point of the second transmitted light. The difference in color point is preferably at least 10 SDCM, more preferably at least 15 SDCM, Most preferably at least 20 SDCM. The color of the first transmitted light is different from the color of the second transmitted light.

A feature of the optical filter system is that during a time period the beam path may be partially intercepted by the first segment and partially be intercepted by the second segment. Hence, would a beam actually propagate, then the beam is partially intercepted by the first segment and partially intercepted by the second segment during a time period (tsp). This implies that the path is first intercepted by one of the segments and then intercepted by the other of the segments, but during the time period, the former is not fully removed from the path and the latter is not yet fully intercepting the path. The time period (tsp) may also be indicated as "spoke time". The spoke time is especially defined by the speed in which the segments intercept the beam and the beam width at the position of interception. Interception is in general with a movement perpendicular to an optical path axis (beam axis when the beam is actually available).

As the former and the latter segment have different transmission characteristics for the light of the beam of light, this may imply that instead of a substantial binary change in the optical properties of the beam of light downstream from the optical filter system during a change from the former segment to the latter segment, during the spoke time there is a gradual change. As indicated above, this is in general not desirable.

The segments are especially optical filters. These segments are transmissive for at least part of the visible light, but different segments may have different transmissions. The fact that the optical filter system is explained in relation to two segments does not exclude that there may be more than two segments. In general, there is a plurality of segments of which at least two, but in general at least four, mutually differ with respect to the spectral dependence of the transmission of the light. As indicated above, the segments can be red, green, blue, yellow, cyan, magenta and/or white and are meant to filter out the required color out of a light source, which emits a broad(er) spectrum. Two or more of the same segments may be available. Especially, the optical filter system comprises at least four different segments. However, in embodiments there may also be segments (in addition to the (at least four) different segments) that have essentially identical transmission characteristics. Here, the terms "identical transmission characteristics" and "different transmission characteristics" and similar terms refer to the wavelength dependence of the transmission characteristics, as also can be derived from the colors of the segments as indicated above.

In a specific embodiment, a color wheel may be applied. Such color wheel may (thus) be used to filter the desired colors out of the spectral distribution of the offered light/to filter away undesired colors from the spectral distribution of the offered light. For instance, the application of a color wheel is described in U.S. Pat. No. 5,967,636 or WO2009069010, which are herein incorporated by reference. Therefore, in embodiments the optical filter system comprises a rotatable element comprising the plurality of segments, and a rotator configured to rotate the rotatable element for having the plurality of segments sequentially intercept the main beam path or the second beam path. In the context of a color wheel, the term "segment" may in embodiments refer to a circle segment but may in embodiments also refer to a circle sector; especially; the term "segment" in the context of a color wheel may refer to a circle sector.

The optical filter system may thus be applied to choose essentially a primary color from the composed light. Primary colors are blue, green, and red. Therefore, downstream of the optical filter system, the system provides the beam of system light, which may comprise one or more of blue light, green light, and red light. In specific embodiments, the first light includes blue light, the second light includes green light, and the third light includes red light. In embodiments, the primary light comprises blue light and (upstream of the optical filter system) the composed light comprises green light and red light.

In embodiments, upstream of the optical filter system, the (second) beam of light may comprise yellow light. Downstream of the optical filter system, the (second) beam of light may comprise composed light or one (or more, but especially essentially one) primary color of the composed light, dependent upon the segment that intercepts the (second) beam of light.

As indicated above, the non-binary analogue or gradual transition between a set of two segments, or a plurality of sets of segments, may be undesirable. The invention provides a solution to make this transition more, or even essentially, binary. This is done by providing primary light during a substantial part of the spoke time and substantially not providing composed light during the spoke time.

Hence, in embodiments during the transition from the first segment to the second segment (or vice versa), instead of having the beam of light during the time the beam of light is being intercepted by both of these comprise composed light, the beam of light essentially only comprises primary light.

This may in embodiments imply that the transmission characteristics of the two segments are mutually differing for the composed light but may essentially be the same for the primary light. The two segments are especially transmissive for the primary light. These embodiments are especially of relevance when the interception is of the beam path of the main beam of light, and thus the beam of light can comprise the primary light and the composed light.

Alternatively, in embodiments the segments intercept the beam path of the composed beam of light upstream of a combination location of the beam path of the composed beam and the beam path of the primary beam (where at this location essentially the main beam (path) may be provided). In such embodiments, the primary beam does not need to pass these segments of the optical filter system, and it may be only necessary to prevent the composed beam of irradiating these segments of the optical filter system during at least part of the spoke time.

Therefore, in embodiments the lighting arrangement is configured to generate the first beam and the second beam at spatially separate positions, and the system further comprises optics configured to combine at a beam path combination location the first beam path and the second beam path into the main beam path. At the combination location, the optics may be used to combine two (or more) beam paths into a single beam path; during operation of the system, at the combination location the optics may be used to combine two (or more) beams into a single beam.

As indicated above, this combination may be simultaneously, i.e. that the beam of light downstream of the combination location comprises the two or more upstream beams, but this combination may also be sequentially, i.e. that the that the beam of light downstream of the combination location comprises the two or more upstream beams, propagating along the same path downstream of the combination location, but one after the other. The beam of system light will especially be directed to a SLM.

The term combination location may also refer to a plurality of combination locations. In specific embodiments, the optics configured to combine at the beam path combination location the first beam path and the second beam path into the main beam path comprises a dichroic mirror. Alternatively or additionally, a dichroic prism may be applied.

The system may further include additional optics like lenses, mirrors, gratings, prisms, etc. etc., which will further not be discussed, unless considered relevant for the invention.

Controlling of the light of the primary beam and controlling of the light of the composed beam may be done by controlling the light arrangement, such as controlling the intensity of the light of the relevant light sources for generating the primary beam of light and the composed beam of light. Especially, when using solid state light sources, switching on and switching off can be very fast. Intensity can alternatively or additionally also be controlled by the power provided to the light source(s) and/or by the number of light sources that are driven (for the respective light source(s) for the primary beam of light and/or the respective light source(s) for the composed beam of light). Alternatively, switching between an on and an off state may be controlled with a chopper. Such chopper may be comprised by the lighting arrangement. With solid state light sources, switching off of the composed light during at least part of the spoke time, and switching on again, may be done very quickly.

Hence, to control the compositions of the light in the beam of system light, the lighting arrangement and the optical filter system may be controlled. To this end, the system may further comprise a control system configured to control the lighting arrangement and the optical filter system such that during the time period (tsp) at least 60% of a spectral power distribution of the system light of the beam of system light consists of the primary light. Even more especially, during the time period (tsp) especially at least, 80%, such as even more especially at least 90%, such as yet even more especially about 100% of a spectral power distribution of the system light of the beam of system light consists of the primary light.

Hence, during at least part of the spoke time, essentially a singly primary light is provided, e.g. blue. The part of the spoke time, i.e. the part of the time period may be at least 50%, such as at least 69%, like at least 80%, even more especially at least 90%, such as especially about 100% of the spoke time may only the primary light be provided.

Therefore, the issue of the spokes is essentially digitally solved by switching on and off the primary beam of light and/or composed beam of light. Especially, the latter is switched off during at least part of the spoke time between two segments.

Note that the invention does not require addressing each spoke in the herein described way. The system is able to compensate, but dependent upon the application or dependent upon the embodiment, the system may compensate or always compensates. Hence, in embodiments the system may be configured to address each spoke in the herein described way. In yet other embodiments, the system may be configured to address one or more spokes in the herein described way. In yet further embodiments, the system may include a control mode wherein one or more spokes are addressed in the herein described way and a mode wherein one or more spokes are not addressed in the herein described way.

The way in which the spokes issue is addressed may in specific embodiments especially imply that the control system is configured to have the system provide the first beam comprising primary light during a first part of the time period (tsp) and not to provide the second beam of the composed light during the same first part of the time period (tsp).

Herein, the phrase "control system is configured to . . . " and similar phrases may especially refer to embodiments wherein the "control system is configured in a specific control mode to . . . ".

The control system may further be configured to control other controllable elements of the system, such as in embodiments the SLM.

The control system may control the system as function of input information, such as e.g. an image, or a plurality of images, such that these are projected.

As indicated above, the segments may intercept the main beam path downstream of the combination location or the second beam path (of the composed light).

Hence, in embodiments the optical filter system is configured to have the segments of the plurality of segments sequentially intercept the main beam path downstream of the beam path combination location. In further specific embodiments, the two or more segments have different transmission characteristics for one or more of the first light, the second light and the third light, with at least a first segment being transmissive for the primary light and being transmissive for (at least one) one of the two others of the first light, the second light, and the third light, and a second segment being transmissive for the primary light and (at least) the other of the one of the two others of the first light, the second light, and the third light. For instance, a first segment may be magenta and a second segment may be cyan; both segments are transmissive for blue light (as example of first light and/or as example of primary light), but have different transmission characteristics for e.g. red and green light (as examples of second light and third light, or as combination as composed light), with magenta essentially absorbing red light but not essentially absorbing green light, and with cyan essentially absorbing green light and not essentially absorbing red light. Likewise a first segment can be cyan and a second segment can be "white" (i.e. essentially all light is transmitted).

For instance, in embodiments a red and a green segment sequentially intercept the main beam path, such as adjacent green and red segments. For instance, in embodiments a blue and a green segment sequentially intercept the main beam path, such as adjacent blue and green segments. For instance, in embodiments a blue and a red segment sequentially intercept the main beam path, such as adjacent blue and red segments. For instance, in embodiments a white and a blue, green or red segment sequentially intercept the main beam path, such as adjacent white and blue, green or red segments. For instance, in embodiments a cyan and a magenta segment sequentially intercept the main beam path, such as adjacent cyan and magenta segments. Hence, a plurality of combinations of two sequentially provided segments, such as a plurality of combinations of segments on a color wheel, may be possible, such as a first segment selected from the group consisting of red, green, blue, yellow, cyan, magenta and/or white, and a second segment selected from the same group, but being different from the first segment. A plurality of different combinations may be provided. For two or more combinations may apply that both segments of combinations may essentially be light transmissive for a primary light but may have different light transmissiveness for the composed light. hence, for two or more combinations may apply that both segments are essentially light transmissive for one (or optionally more) of the first light, the second light and the third light, and the segments have different light transmissivenesses for one or more of the other types of light (for which the segments are essentially light transmissive).

Therefore, in specific embodiments both the first segment and the second segment are transmissive for the primary light, wherein the primary light comprises the first light, and wherein in embodiments the first light comprises blue light, and wherein the first segment has a higher transmission for the second than for the third light and wherein the second segment has a higher transmission for the third light than for the second light, wherein the second light comprises in embodiments green light, and wherein the third light comprises in embodiments red light. Here, the term "higher" may especially indicate at least two times higher, such as at least four times higher, like at least 10 times higher.

For instance, in an example, when comparing the spectral power of light downstream of the first or second segment, respectively, in the green spectral range (in Watt) for the first segment and the second segment, the spectral power downstream of the first segment may be at least two times higher than downstream of the second segment (of course under identical optical conditions). However, when comparing the spectral power of light downstream of the first or second segment, respectively, in the red spectral range (in Watt) for the first segment and the second segment, the spectral power downstream of the second segment may be at least two times higher than downstream of the first segment (of course under identical optical conditions).

Analogous considerations apply when the first light would e.g. include green light, the second light would e.g. include red light, and the third light would e.g. include blue light. These ordinal numbers are essentially only used for reference purposes.

In yet other embodiments, the optical filter system is configured to have the segments of the plurality of segments sequentially intercept the second beam path upstream of the beam path combination location. In such embodiments, the first beam path combines with the second beam path downstream of the position wherein the segments intercept the second beam path.

Hence, in specific embodiments, wherein the composed light has the spectral distribution with at least 60%, such as especially at least 80%, even more especially at least 90%, yet even more especially about 100% of the spectral power consisting of the two others of the first light, the second light, and the third light, two or more segments may especially have different transmission characteristics for these two others, with at least a first segment being transmissive for one of the two others (and essentially not for the other of the two others), and a second segment being transmissive for the other of the two others (and essentially not for the one of the two others). For instance, here again the same examples may be applied of magenta and cyan, assuming the composed light comprises yellow light, which can then be separated into red and green, as magenta may essentially be absorbing red light but not essentially absorbing green light, and cyan may essentially be absorbing green light and not essentially absorbing red light. During the potential spoke (as the composed light may temporarily be interrupted from irradiating), only the primary light may be provided.

Hence, in embodiments, which also comply with above illustrative example of e.g. magenta and cyan segments, the first segment may have a higher transmission for the second than for the third light, such as at least two times higher, even more especially at least four times higher, and the second segment may have a higher transmission for the third light than for the second light, such as at least two times higher, even more especially at least four times higher, wherein in specific embodiments the second light comprises green light, and wherein the third light comprises red light.

Hence, in embodiments the first segment may essentially absorb the third light and the second segment may essentially absorb the second light. As mentioned above, these ordinal numbers are essentially only used for reference purposes.

In an aspect, the invention also provides a projection system or a luminaire comprising the system for processing light as described herein, or a plurality of such lighting devices.

In yet a further aspect, the invention provides a projector comprising the system for processing light as defined herein. As indicated above, of course the projector may also include a plurality of such systems for processing light.

In yet a further aspect, the invention also provides a lighting system configured to provide lighting system light, the lighting system comprising one or more systems for processing light as defined herein. Here, the term "lighting system" may also be used for a (digital) projector.

Further, the system for processing light may be used for e.g. stage lighting (see further also below), or architectural lighting. Therefore, in embodiments the invention also provides a lighting system as defined herein, wherein the lighting system comprises a digital projector, a stage lighting system or an architectural lighting system. The lighting system may comprise one or more systems for processing light as defined herein. Hence, the invention also provides a lighting system configured to provide visible light, wherein the lighting system comprises at least one system for processing light as defined herein. For instance, such lighting system may also comprise one or more (additional) optical elements, like one or more of optical filters, collimators, reflectors, wavelength converters, lens elements, etc. The lighting system may be, for example, a lighting system for use in an automotive application, like a headlight. Hence, the invention also provides an automotive lighting system configured to provide visible light, wherein the automotive lighting system comprises at least one system for processing light as defined herein and/or a digital projector system comprising at least one system for processing light as defined herein. Especially, the system for processing light may be configured (in such applications) to provide red light. The automotive lighting system or digital projector system may also comprise a plurality of the systems for processing light as described herein.

In yet a further aspect, the invention also provides a method for processing light with a system comprising one or more solid state light sources and configured to provide along a main beam path a beam of system light, wherein the system light comprises one or more of first light having a first spectral distribution, second light having a second spectral distribution, and third light having a third spectral distribution, wherein the first, second, and third spectral distributions mutually differ, wherein the method comprises:

providing along a first beam path a first beam comprising primary light having a spectral power distribution with at least 80% of the spectral power consisting of one of the first light, the second light, and the third light, and/or providing along a second beam path a second beam comprising composed light having a spectral distribution with at least 80% of the spectral power consisting of the two others of the first light, the second light, and the third light;

sequentially intercepting the main beam path or the second beam path, wherein during a time period (tsp) the beam path is partially intercepted by a first segment of an optical filter system and partially intercepted by a second segment of the optical filter system, wherein two or more segments have different transmission characteristics for one or more of the primary light and the composed light; and controlling the system light of the beam of system light such that during the time period (tsp) at least 80% of a spectral power distribution of the system light of the beam of system light consists of the primary light.

In yet a further aspect, the invention also provides a computer program product, when running on a computer which is comprised by or functionally coupled to the projection system, especially as defined herein, is capable of bringing about the method as described herein.

The lighting device may be part of or may be applied in e.g. office lighting systems, household application systems, shop lighting systems, home lighting systems, accent lighting systems, spot lighting systems, theater lighting systems, fiber-optics application systems, projection systems, self-lit display systems, pixelated display systems, segmented display systems, warning sign systems, medical lighting application systems, indicator sign systems, decorative lighting systems, portable systems, automotive applications, (outdoor) road lighting systems, urban lighting systems, green house lighting systems, horticulture lighting, or LCD backlighting.

The term "light source" may refer to a semiconductor light-emitting device, such as a light emitting diode (LEDs), a resonant cavity light emitting diode (RCLED), a vertical cavity laser diode (VCSELs), an edge emitting laser, etc. The term "light source" may also refer to an organic light-emitting diode, such as a passive-matrix (PMOLED) or an active-matrix (AMOLED). In a specific embodiment, the light source comprises a solid-state light source (such as a LED or laser diode). In an embodiment, the light source comprises a LED (light emitting diode). The term LED may also refer to a plurality of LEDs. Further, the term "light source" may in embodiments also refer to a so-called chips-on-board (COB) light source. The term "COB" especially refers to LED chips in the form of a semiconductor chip that is neither encased nor connected but directly mounted onto a substrate, such as a PCB. Hence, a plurality of semiconductor light sources may be configured on the same substrate. In embodiments, a COB is a multi LED chip configured together as a single lighting module. The term "light source" may also relate to a plurality of light sources, such as 2-2000 solid state light sources.

The term white light herein, is known to the person skilled in the art. It especially relates to light having a correlated color temperature (CCT) between about 2000 and 20000 K, especially 2700-20000 K, for general lighting especially in the range of about 2700 K and 6500 K, and for backlighting purposes especially in the range of about 7000 K and 20000 K, and especially within about 15 SDCM (standard deviation of color matching) from the BBL (black body locus), especially within about 10 SDCM from the BBL, even more especially within about 5 SDCM from the BBL.

In an embodiment, the light source may also provide light source light having a correlated color temperature (CCT) between about 5000 and 20000 K, e.g. direct phosphor converted LEDs (blue light emitting diode with thin layer of phosphor for e.g. obtaining of 10000 K). Hence, in a specific embodiment the light source is configured to provide light source light with a correlated color temperature in the range of 5000-20000 K, even more especially in the range of 6000-20000 K, such as 8000-20000 K. An advantage of the relative high color temperature may be that there may be a relative high blue component in the light source light.

The terms "violet light" or "violet emission" especially relates to light having a wavelength in the range of about 380-440 nm. The terms "blue light" or "blue emission" especially relates to light having a wavelength in the range of about 440-495 nm (including some violet and cyan hues). The terms "green light" or "green emission" especially relate to light having a wavelength in the range of about 495-570 nm. The terms "yellow light" or "yellow emission" especially relate to light having a wavelength in the range of about 570-590 nm. The terms "orange light" or "orange emission" especially relate to light having a wavelength in the range of about 590-620 nm. The terms "red light" or "red emission" especially relate to light having a wavelength in the range of about 620-780 nm. The term "pink light" or "pink emission" refers to light having a blue and a red component. The terms "visible", "visible light" or "visible emission" refer to light having a wavelength in the range of about 380-780 nm.

BRIEF DESCRIPTION OF THE DRAWINGS

Embodiments of the invention will now be described, by way of example only, with reference to the accompanying schematic drawings in which corresponding reference symbols indicate corresponding parts, and in which.

The schematic drawings are not necessarily to scale.

DETAILED DESCRIPTION OF THE EMBODIMENTS

Figure 1:
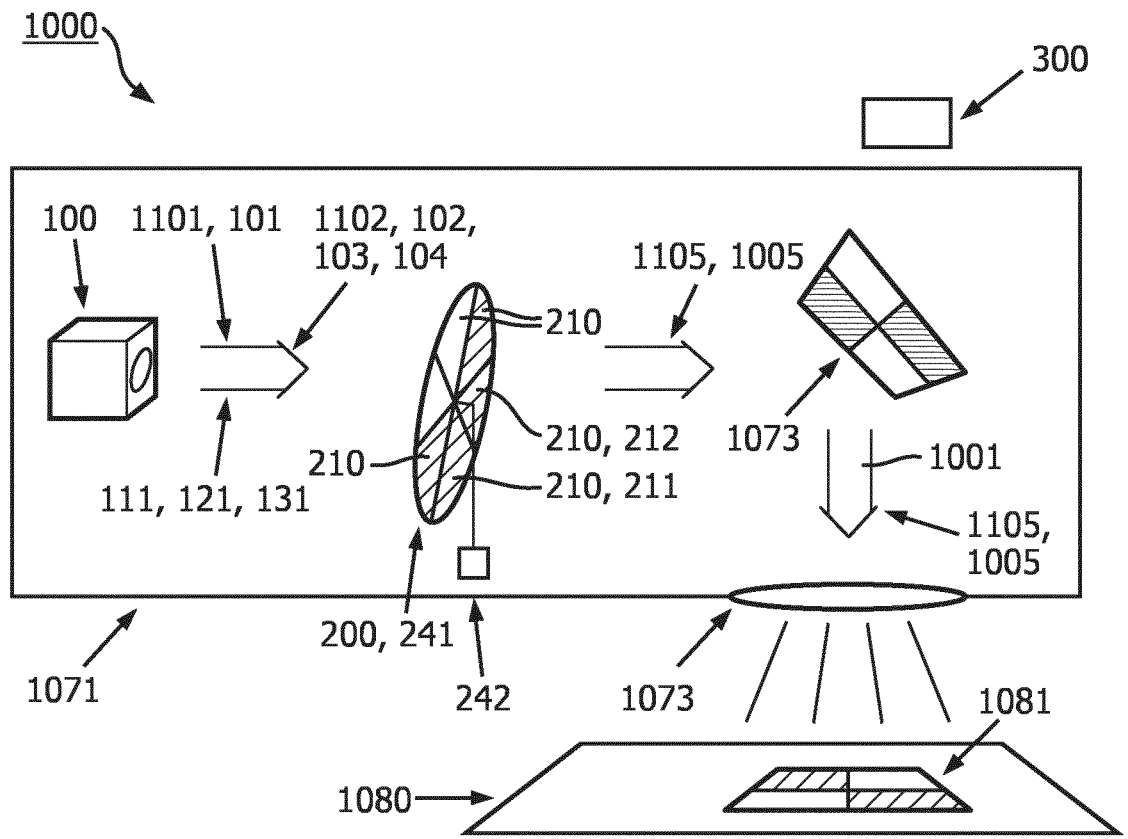
FIG. 1 schematically depicts an embodiment of the system.

FIG. 1 schematically depicts an embodiment of system 1000 for processing light. The system 1000 is configured to provide along a main beam path 1105 a beam 1005 of system light 1001. The system light 1001 comprises one or more of first light 111 having a first spectral distribution, second light 121 having a second spectral distribution, and third light 131 having a third spectral distribution. The first, second, and third spectral distributions mutually differ; see also FIG. 2a.

The system 1000 comprises a lighting arrangement 100, an optical filter system 200, and a control system 300.

The lighting arrangement 100 may be configured to provide along a first beam path 1101 a first beam 101 comprising primary light 103 having a spectral power distribution with e.g. at least 80% of the spectral power consisting of one of the first light 111, the second light 121, and the third light 131. Further, the lighting arrangement 100 may be configured to provide along a second beam path 1102 a second beam 102 comprising composed light 104 having a spectral distribution with e.g. at least 80% of the spectral power consisting of the two others of the first light 111, the second light 121, and the third light 131; see also FIG. 2a.

The optical filter system 200 comprises a plurality of segments 210. Two or more segments 210 have different transmission characteristics for one or more of the primary light 103 and the composed light 104. During operation of the system 1000, the optical filter system 200 is configured to have the segments 210 of the plurality of segments 210 sequentially intercept the main beam path 1105 or the second beam path 1102, wherein during a time period tsp, the spoke time, the beam path 1105, 1102 is partially intercepted by a first segment 211 and partially intercepted by a second segment 212. The phrase "the beam path 1105, 1102 is (partially) intercepted" and similar phrases especially indicate that either beam path 1105 or beam path 1102 is (partially) intercepted.

Here, an example is depicted wherein the optical filter system 200 comprises a rotatable element 241, especially here a color wheel, comprising the plurality of segments 210, and a rotator 242 configured to rotate the rotatable element 241 for having the plurality of segments 210 sequentially intercept the main beam path 1105 or the second beam path 1102.

The control system 300 is configured to control the lighting arrangement 100 and the optical filter system 200 such that during the time period tsp at least 80% of a spectral power distribution of the system light 1001 of the beam 1005 of system light 1001 consists of the primary light 103.

The control system 300 may be comprised by a closed unit 1071 comprising amongst others the lighting arrangement 100 and the optical filter system 200, but may also be configured external thereof. Reference 1072 indicates a light exit window, which may e.g. be a lens. Reference 1073 indicates an SLM. Reference 1080 indicates a surface, such as a wall or screen, on which an image 1081 is depicted. The image 1081 is created by the light from the lighting arrangement 100, optionally spectrally adapted by the optical filter system 200, and via the pixelated SLM configured into an image 1081. This may be done on the basis of a digital image known to the control system 300.

Figure 2A:
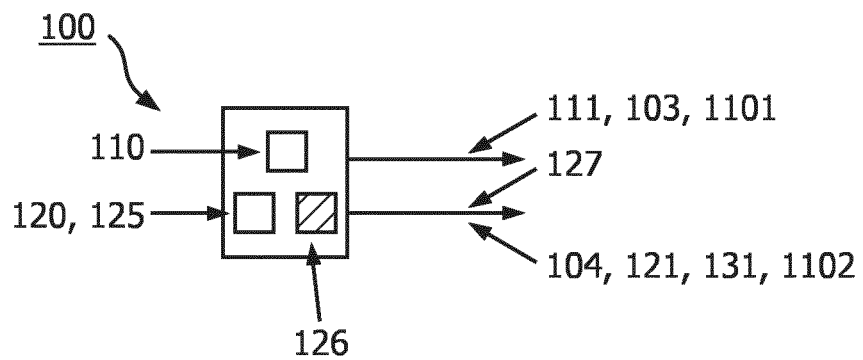
FIGS. 2a-2c schematically depict some embodiments and/or variants.

FIG. 2a schematically depicts an embodiment wherein the system 1000, more especially the lighting arrangement 100 comprises a first light source 110 configured to generate primary light 103 and a second light source 120 configured to generate the composed light 104.

Figure 2B:
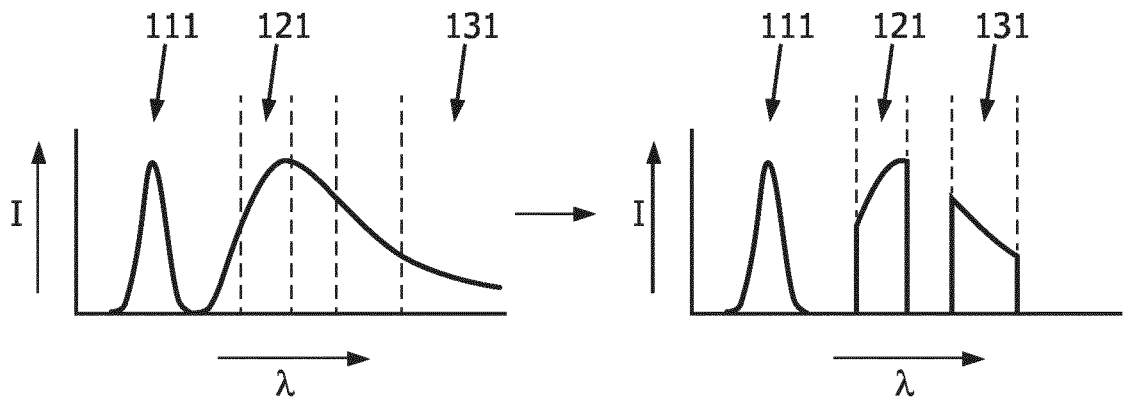

FIG. 2b schematically depicts a spectral distribution of the combination of the first light 111, the second light 121 and the third light 131, generated by an embodiment of the lighting arrangement 100. For the sake of ease, these are depicted in a single graph. However, as indicated elsewhere, these types of light are not necessarily available in a single beam (throughout the whole system during all operation time).

For instance, a first light source may be configured to generate first light 111 and a second light source may be configured to generate composed light comprising second light 121 and third light 131.

FIG. 2b is also used to schematically depict an embodiment wherein the second light source 120 comprises a pump light source 125 configured to generate pump light source light 126 and a luminescent material 126 configured to convert at least part of the pump light source light 126 into luminescent material light 127, such as $Y_3Al_5O_{12}:Ce^{3+}$, wherein the composed light 104 comprises the luminescent material light 127. For instance, the first light source 110 comprises a solid-state light source, and/or especially the second light source 120 comprises a solid-state light source.

Note that the spectral distribution shown on the left in FIG. 2b is a very schematic representation, which is also used to schematically depict how the filter system 200 may have impact on the spectral distribution of the light from the lighting arrangement. For instance, the filter system may not be applied for the first light 111 and/or have no impact on the first light 111. However, the band of light with both second light and third light 131 may be separated in two separated bands, which may e.g. be provided sequentially, due to the use of the optical filter system.

As can be seen from FIG. 2b, right drawing, the first, second, and third spectral distributions mutually differ. Their centroid wavelengths may be at least 50 nm from each other. Further, there may be essentially no spectral overlap. The term "centroid wavelength", is known in the art, and refers to the wavelength value where half of the light energy is at shorter and half the energy is at longer wavelengths; the value is stated in nanometers (nm). It is a spectral average of the intensity over the wavelength ($\Sigma \lambda^* I\lambda/(\Sigma I)$; i.e. the integration of the intensity over the emission band normalized to the integrated intensity). Again, the different types of light are not necessarily available in a single beam (throughout the whole system during all operation time). In contrast, the second and third types of light will during part of the operation time be sequentially available in the beam of system light (downstream of the optical filter system).

Figure 2C:
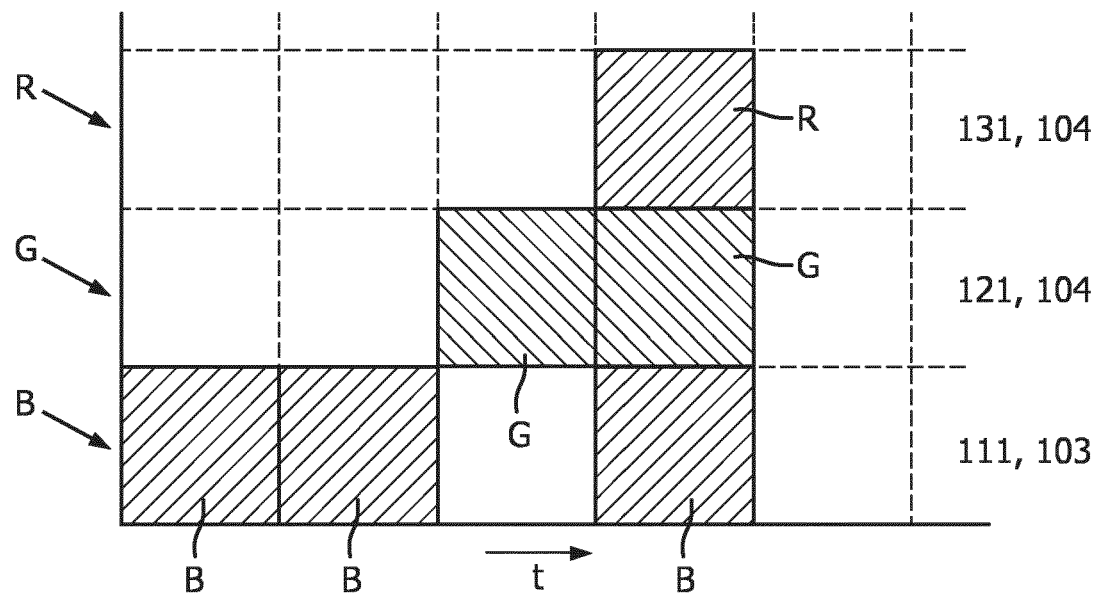

FIG. 2c very schematically depicts the output downstream of the optical filter system as function of time, using a first beam 103 of first light and a second beam 104 of second light 121 and third light 131. In the first two periods, e.g. only first light 111 is provided. This may be reached by filtering out all other light, or by providing only first light 111 and e.g. not providing the composed beam 104. In the third period, no first light 111 is provided, and the composed beam 104 is filtered such that only second light passes. In the fourth period, all types of light is provided, e.g. when the optical filter system has a segment that is transmissive for all types of (visible) light. This figure shows some basic principles, and is not addressing the spoke time (yet).

As schematically shown in FIG. 2c, during operation system light of the beam of system light may comprise simultaneously ($4^{th}$ period) or sequentially ($1^{st}$, $2^{nd}$, or $3^{rd}$ period) the primary light 103 and the composed light 104.

The currently available DLP color wheels for lamp and/or SSI based projectors consist of a few (typically 3-8) color filter segments. These color filter segments can be Red, Green, Blue, Yellow, Cyan, Magenta and/or White and are meant to filter out the required color out of a light source, which emits a broad(er) spectrum.

Figure 3A:
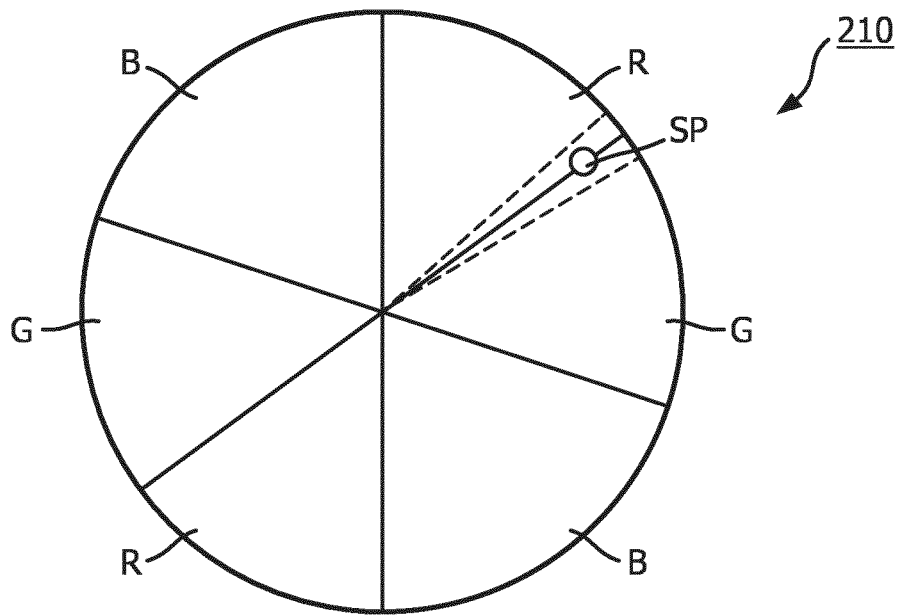
FIG. 3a schematically depicts an example of a standard RGBRGB color wheel ("CW") in which conventional spokes of 12° are indicated.

One of the main disadvantages of this principle is that 'undefined' light is emitted at the transition area between the different color segments. These areas on the color wheel are commonly referred to as conventional spokes. Typically, conventional spokes take away 12°-18° from each color segment on the color wheel. The exact amount is determined by the size of the light spot onto the color wheel. FIG. 3a schematically depicts an example of a standard RGBRGB color wheel in which conventional spokes of 12° are indicated. The values in the circle sectors (examples of segments 210) indicate the circle sector angles. The spokes are indicated with reference SP and have sector angles of 12°. The small circle, indicated with reference LS, indicates the light spot of the light of the lighting arrangement. This may e.g. be the primary beam or the composed beam or a combination thereof. Hence, though the segments may be well defined physically, the size of the light spot determines the spokes size.

Below, a first example of a design of a standard color wheel versus a fully transparent color wheel for blue light is discussed.

A standard RGBRGB color wheel (see above) for lamp-based projectors would consist of 6 color wheel segments:
  2× red segment: high pass filter at e.g. 600 nm; not transparent for blue light;
  2× green segment: band pass filter at e.g. 497 nm-577 nm; not transparent for blue light;
  2× blue segment: low pass filter at e.g. 497 nm; transparent for blue light.

The above color wheel, see also e.g. FIG. 3a would be applied for non-overlap applications (e.g. video). Other applications (data, education, . . . ) can apply different kinds of color wheel including overlap (cyan, yellow, white and/or magenta) segments in addition to RGB segment.

To fully utilize in a second example an embodiment of the proposed invention the following MCWMCW color wheel is proposed to replace the standard RGBRGB color wheel:
  2× magenta segment: band stop filter at e.g. 497 nm-600 nm; transparent for blue light;
  2× cyan segment: low pass filter at e.g. 577 nm; transparent for blue light;
  2× transparent (white) segment; transparent for visual spectrum/or 2× blue segment: low pass filter at e.g. 497 nm; transparent for blue light.

For non-overlap applications, such as video applications, a color wheel comprising only magenta and cyan segments would be sufficient.

Alternatively, the blue light source could be mounted in the optical path after the color wheel to obtain the same advantages. In this case, the color wheel could in embodiments e.g. look like the following example to replace the previous two examples (RGWRGW):
  2× red segment: high pass filter at e.g. 600 nm;
  2× green segment: low pass filter @ e.g. 577 nm;
  optionally: 2× transparent (white) segment.

Below, an example is given how to operate the two alternative color wheels to cancel out conventional spokes.

Conventional spokes can be cancelled out by using digital spokes. Digital spokes take much less time compared to conventional spokes. The following example will show the impact.

Figure 3B:
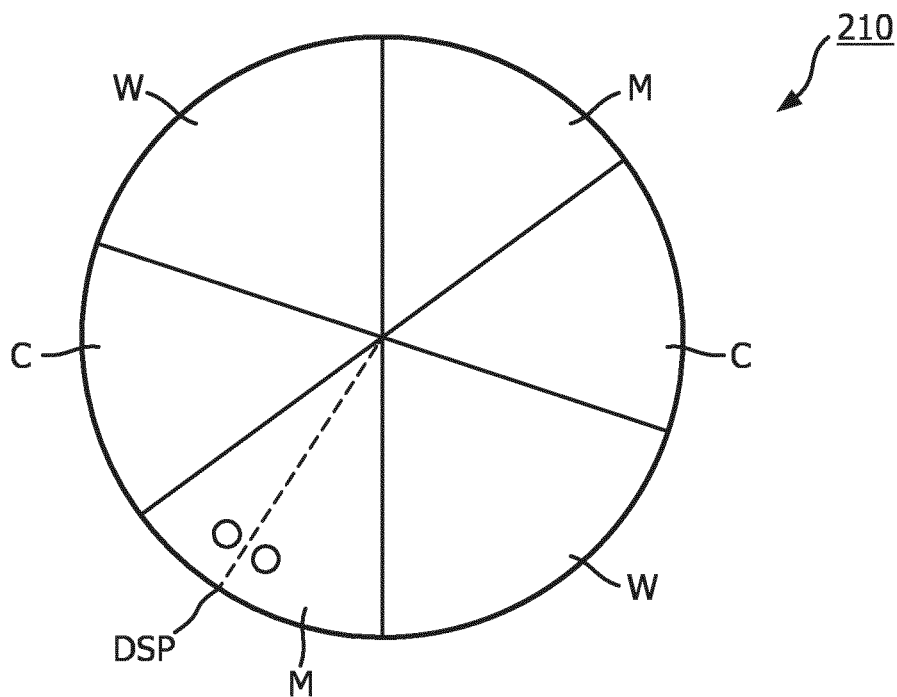
FIG. 3b shows an example of a MCWMCW color wheel in which conventional spokes are cancelled out and very small (±0.5°) digital spokes remain.

FIG. 3b shows an example of a MCWMCW color wheel in which conventional spokes are cancelled out and very small (±0.5°) digital spokes remain.

The digital spoke (dsp) may essentially be anywhere at the segment (and thus not at the location of two neighboring segments); this is the freedom which is herein provided. The time lost for a conventional system and according to embodiments of the presently proposed system were calculated.

For the first example, the following input information is used: assuming a spot size (SpS) of 12°; standard RGBRGB color wheel: 6 segments meaning 6 color transitions (=conventional spokes). Then, total conventional spokes size= (6*12°)/360°=20%, i.e. 20% of the time is occupied by conventional spokes.

For a blue transparent MCWMCW color wheel, the following input information is used: ideally, all 6 color transitions can be cancelled out by turning on blue during these transitions; a digital spoke is limited in speed by the electronic ballast controlling the light sources. Typical rise times are between 1 µs–10 µs, typical fall times are between 0.1 µs–3 µs. Then, the total digital spokes size=6*13 µs=78 µs. This means that 78 µs/8333 µs<1% of the time is occupied by digital spokes at a typical color wheel rotation speed of 120 Hz.

For a RGWRGW color wheel with blue mounted in the optical path after the color wheel it appears that the same calculation holds as for the blue transparent MCWMCW color wheel. Hence, <1% of the time is occupied by digital spokes at a typical color wheel rotation speed of 120 Hz.

In a third example, some (further) options have been calculated. For a given non-overlap (e.g. video) application following duty cycles (DC) are required for red, green and blue: R=40%; G=28%; B=32%.

Figure 4A:
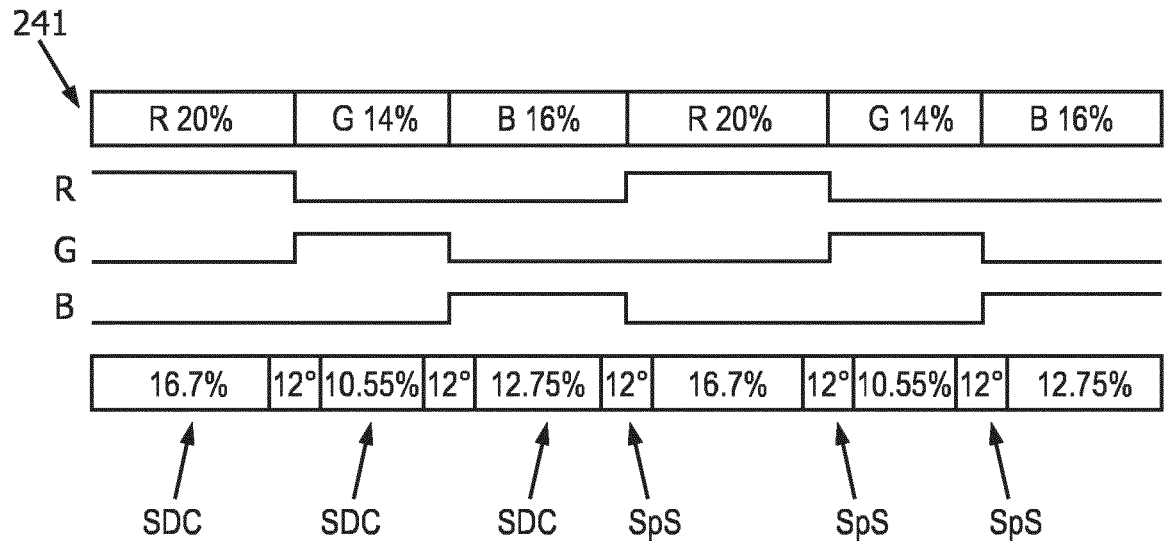
FIGS. 4a-4c schematically depict some (comparative) examples.

These duty cycles could e.g. be obtained with a standard RGBRGB color wheel 241 by using the configuration as also schematically depicted in FIG. 4a (upper bar), with R indicating red, G indicating green, and B indicating blue, and the percentages indicating the percentage of 360° the circle sector is of the wheel. Reference SDC in the lower bar indicates the system duty cycles. Assuming conventional spokes of 12°, the real DC that remains for RGB are the following:
  R=20%*360°=72° from which 12° is spoke area (72°−12°)*2/360°=33.4% pure red DC remains;
  G=14%*360°=50° from which 12° is spoke area (50°−12°)*2/360°=21.1% pure green DC remains;
  B=16%*360°=58° from which 12° is spoke area (58°−12°)*2/360°=25.5% pure blue DC remains.

The total pure RGB DC=33.4%+21.1%+25.5%=80% which means 20% is spoke area which cannot be used to produce primary colors. This color wheel is limited to non-overlap applications only. In case overlap applications need to be supported, the color wheel should be changed. Vice versa, color wheels that contain overlap segments are not suitable for use in non-overlap applications since the overlap segments should be disabled in that case. This would lead to unacceptable efficiency and/or performance losses. For instance, a color wheel containing an overlap in segments of 20% would mean that 20% of the color wheel cannot be used in non-overlap applications.

Figure 4B:
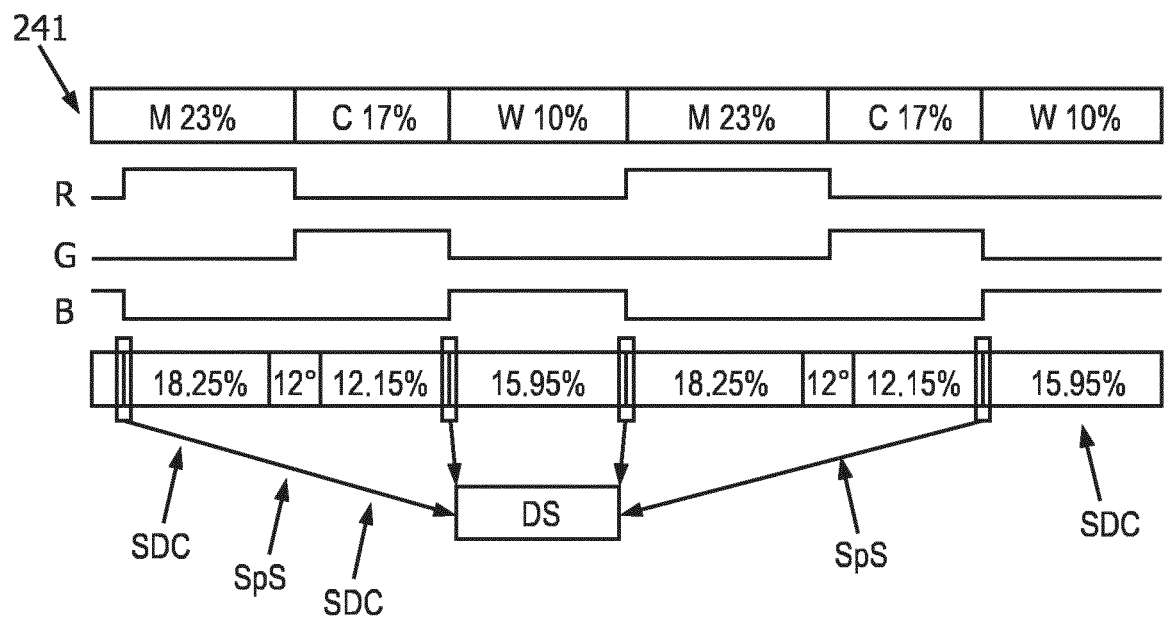

A further option would include a MCWMCW color wheel using digital spokes as described herein; see the option schematically depicted in FIG. 4b, with M indicating magenta, C indicating cyan, and W indicating white; DS indicates digital spokes. In this example two conventional spokes of 12° remain. The real DC that remains for RGB are the following:

R=20%*360°=72° from which 6° is conventional spoke area and 0.25° is digital spoke area (72°−6°−0.25)*2/360°=36.5% pure red DC remains;

G=14%*360°=50° from which 6° is conventional spoke area and 0.25° is digital spoke area (50°−6°−0.25°)*2/360°=24.3% pure green DC remains;

B=16%*360°=58° from which 0° is conventional spoke area and 0.5° is digital spoke area (58°−0°−0.5°)*2/360°=31.9% pure blue DC remains.

Hence, the total pure RGB DC=36.5%+24.3%+31.9%=92.7% which means that 7.3% is spoke area which cannot be used to produce primary colors. Therefore, by using the proposed invention, the total spoke area can be reduced with ±65%. The proposed color wheel in this example can also be used in applications, which require overlap. With this color wheel, it is possible to create magenta, cyan and/or white overlap segments. This allows great flexibility without the need of changing the color wheel itself. Overlap segments are segments that allow more than one of the primary colors to be transmitted.

Figure 4C:
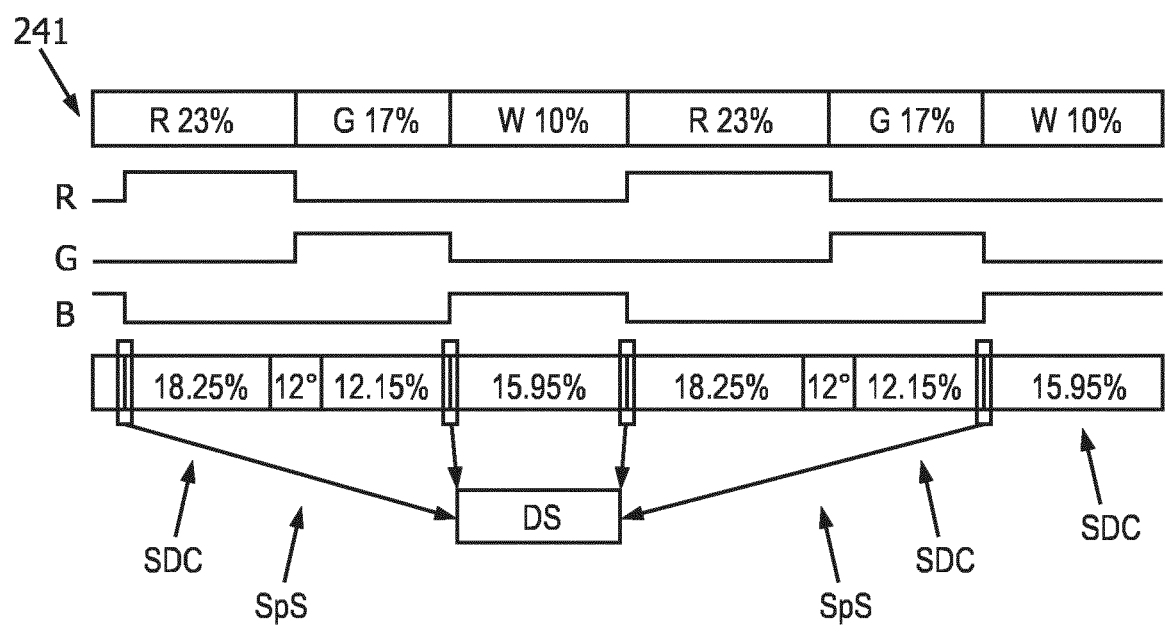

FIG. 4c schematically depicts an embodiment wherein the segments, such as provided by a filter wheel, are configured such that blue light, as example of first light, is provided downstream of such filter wheel. Hence, a combination location is downstream of the optical filter system. In embodiments, blue may thus be added after the color wheel.

Figure 5A:
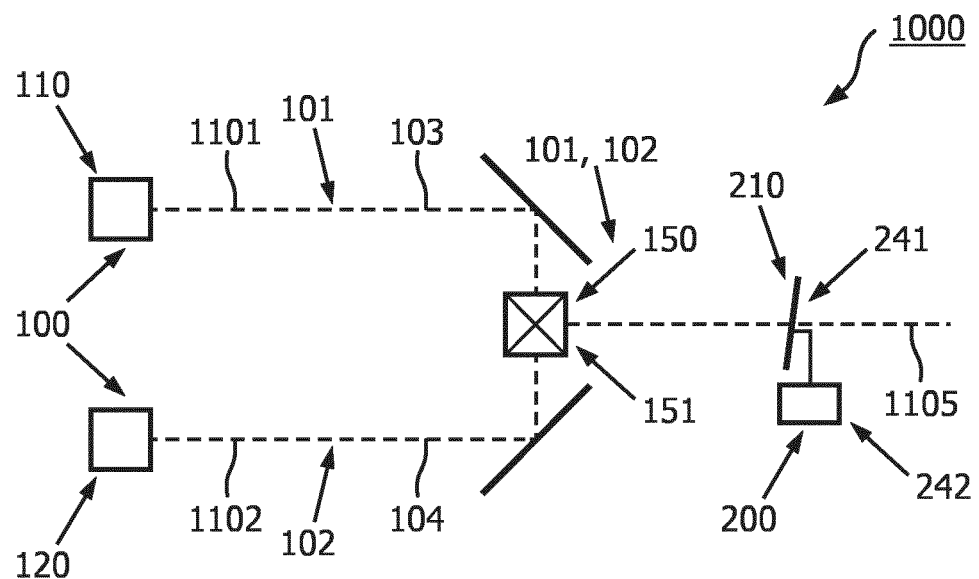
FIGS. 5a-5d schematically depicts some embodiments.
Figure 5B:
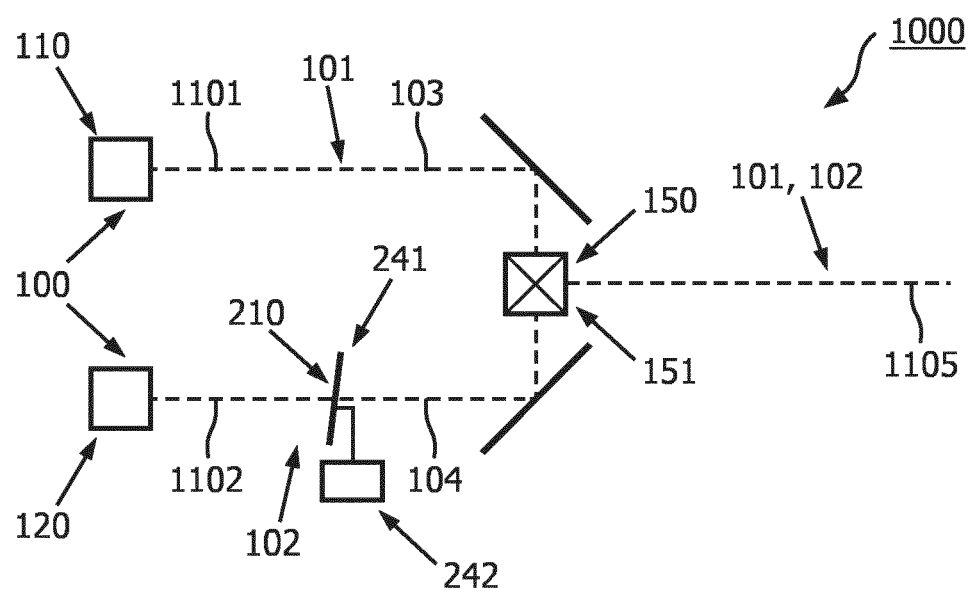

FIGS. 5a-5b schematically depict two main embodiments. For both embodiments apply that the lighting arrangement 100 is configured to generate the first beam 101 and the second beam 102 at spatially separate positions. Further, the system 1000 (of which not all elements, such as no controller, are (is) depicted) further comprises optics 150, like one or more dichroic mirrors, configured to combine at a beam path combination location 151 the first beam path 1101 and the second beam path 1102 into the main beam path 1105.

FIG. 5a schematically shows an embodiment wherein the optical filter system 200 is configured to have the segments 210 of the plurality of segments 210 sequentially intercept the main beam path 1105 downstream of the beam path combination location 151. In such embodiment, it may be necessary to have two or more segments light transmissive for the light of the primary beam of light.

FIG. 5b, however, shows an embodiment wherein the optical filter system 200 is configured to have the segments 210 of the plurality of segments 210 sequentially intercept the second beam path 1102 upstream of the beam path combination location 151.

Figure 5C:
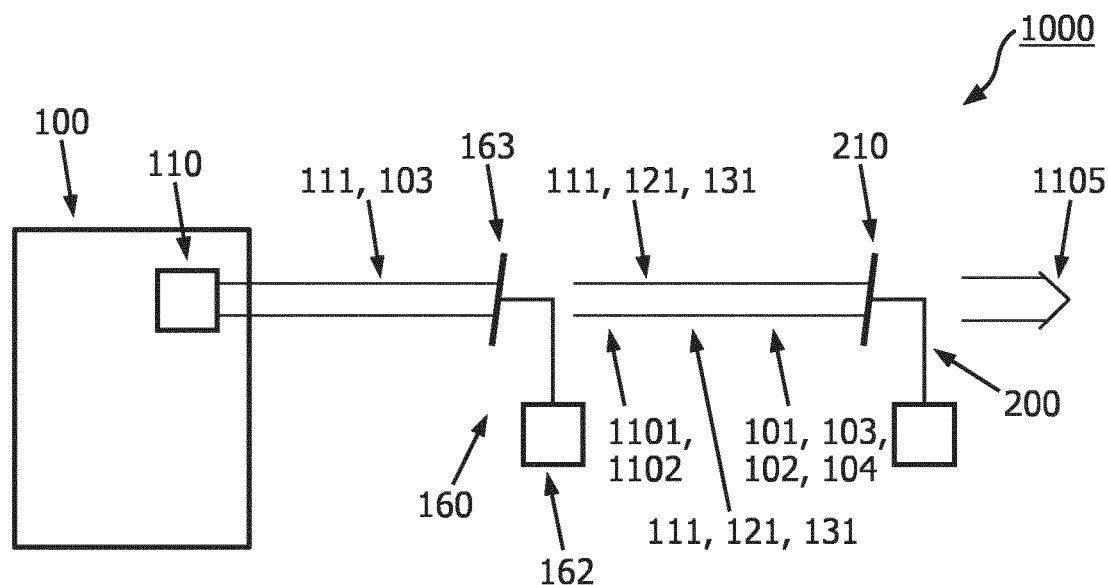

FIG. 5c schematically depicts an embodiment wherein the lighting arrangement 100 comprises e.g. a singly type of light sources, herein indicated as first light source 110, though in embodiments there may be only of these type of light sources, such as one or more lasers have essentially the same pump wavelength. The light escaping from the light source is directed to a phosphor wheel with luminescent materials. A phosphor wheel system, herein indicated as luminescent color wheel system, is indicated with reference 160, with reference 163 indicating the color with segments with different luminescent materials (analogous to the optical filter color wheels herein also explained, but in these embodiments thus with luminescent materials), and with a rotator 162 for rotating the color wheel 163. Here, a single light source, such as a laser, may ultimately generate different types of light due to the color wheel system 160 with rotating color wheel with different luminescent materials. Note that part of such color wheel 163 may also be transparent, allowing light source light 111 being used as (primary light) 103. The light downstream of the color wheel system 160 may comprise one or more of first light 111, second light 121, and third light 131.

Figure 5D:
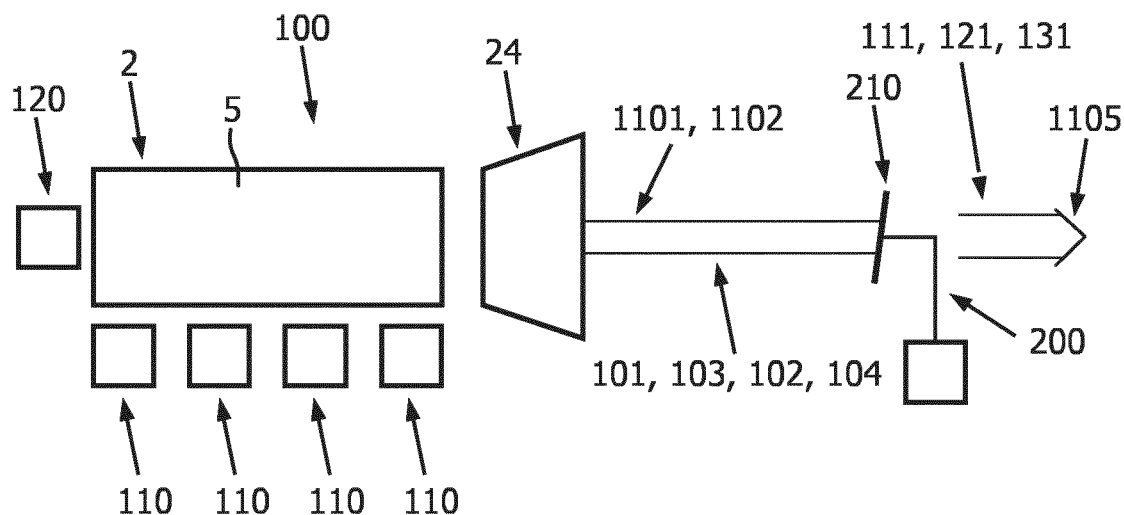

Likewise, FIG. 5d schematically depicts an embodiment wherein the lighting arrangement 100 comprises provides a single beam being the first beam 101 and/or the second beam 103. Here, a plurality of light sources 110 may be used to pump a light transmissive body 2, which comprises luminescent material 5. The transmissive body may be glass, quartz, crystalline material, ceramic material, or a polymeric material. The light source may all be able to excite the luminescent material. In embodiments, different luminescent materials 5 may be applied which may primarily be excited by different light sources 110. Alternatively or additionally, a further light source may be applied, here indicated as second light source 120, which may generate light that may essentially not be absorbed by the transmissive body 2 (including the luminescent material 5), and which may optionally be used as primary (or other) light source. Reference 24 indicates an optical element, such as here a collimator.

Figure 6A:
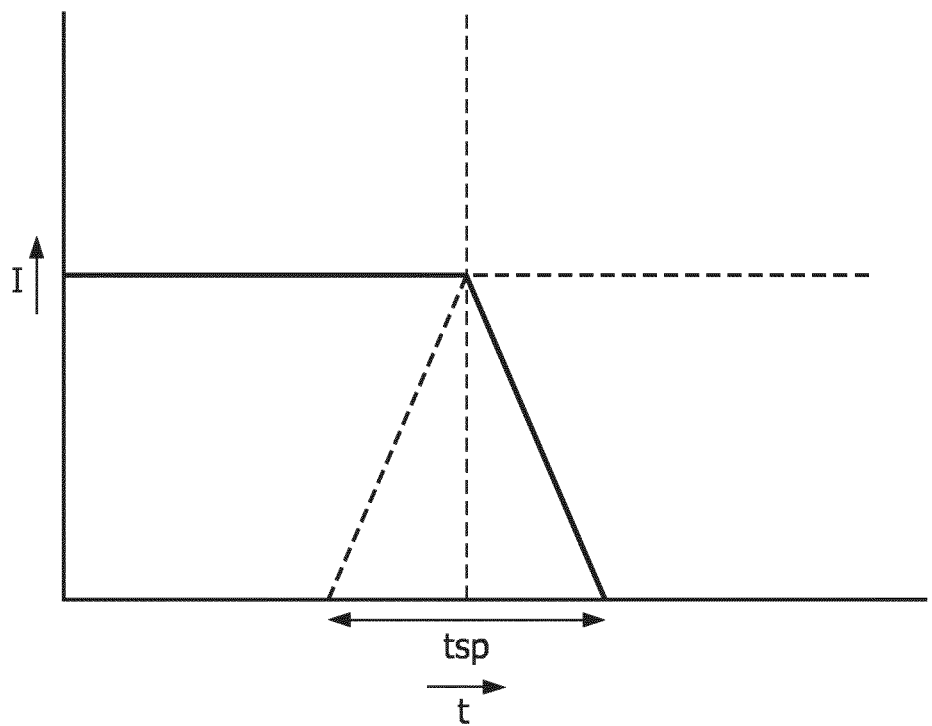
FIGS. 6a-6b schematically depict some aspects.
Figure 6B:
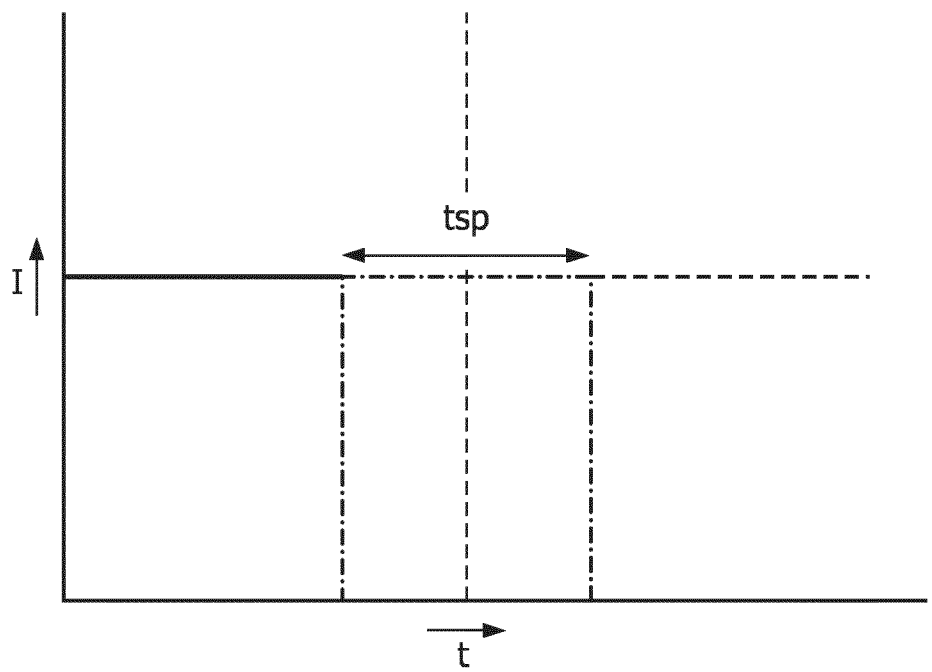

FIGS. 6a-6b schematically depict the intensity of the light downstream of the segments over time. Before the vertical dashed line, primarily a first color of light (full line) is transmitted and after the dashed line, primarily a second color of light (dashed line) is transmitted. Due the spoke effect, there is not a binary change, but a gradual decrease with time of the first color of light, until the beam is not irradiating a first segment anymore, and a gradual increase when the beam starts irradiating a second segment. The dashed line may indicate when the beam (or optical axis) is essentially between the first and second segment. Hence, during the spoke time tsp, the light that is transmitted is not purely the first color of light or the second color of light, but a combination. Therefore, "undefined" light is emitted at the transition area between the different color segments.

FIG. 6b shows a solution as defined herein, wherein the light that would otherwise lead to an undesired mixture of light during the spoke time (especially thus composed light) is switched off (or otherwise impeded to reach the segments), and e.g. another type of light (dashed dotted), especially primary light, is provided during the spoke time. In the embodiment of FIG. 5a, then the relevant segments should be at least partially transmissive for such other type of light, whereas in the embodiment of FIG. 5b, such light may not necessary pass the segments, as it is combined downstream of the optical filter system to the second beam.

As shown in FIG. 6b, about 100% of a spectral power distribution of the system light of the beam of system light consists of the primary light.

Herein, the beams of light draw in the drawings by definition also indicate the beam paths. In other words, the beam paths are available by definition, whether or not actually a beam of light follows such path or is temporarily switched off.

The invention can e.g. be applied in digital projection systems using TI DLP products, which need to use color wheels. All products containing one or more broad-spectrum light sources, which need a color wheel to split up colors, and one or more narrow spectrum light sources, which can generate a single color without the need of a color wheel, would benefit from this invention. Specifically, DPL HLD products would benefit greatly from this invention. However, also laser-phosphor or hybrid laser-LED based projection system can benefit from this invention.

Figure 7:
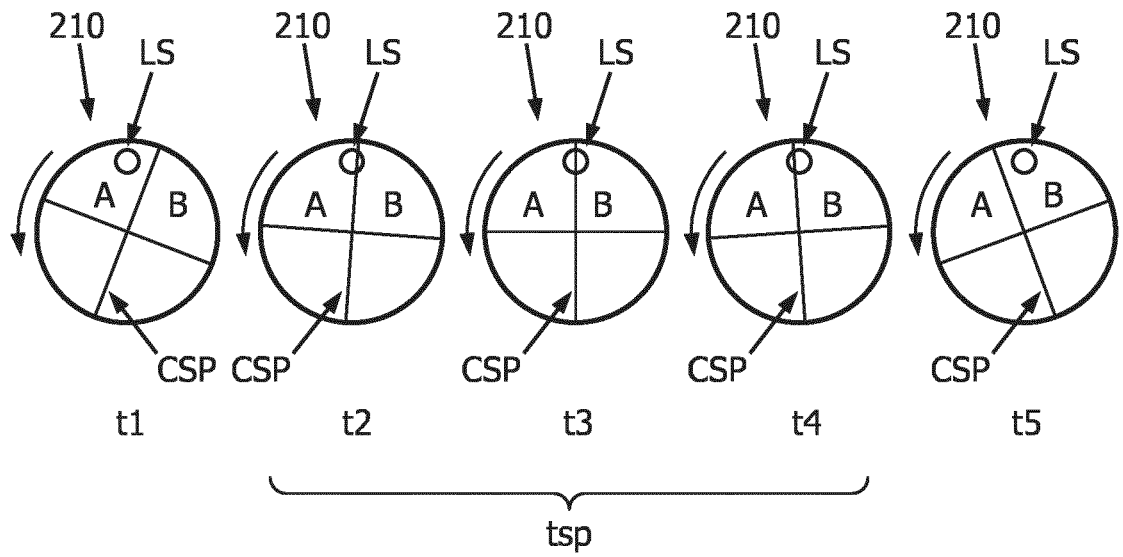
FIG. 7 schematically depicts an embodiment of the system.

FIG. 7 schematically depicts an example. The optical filter system 200 comprises a plurality of segments 210, wherein two or more segments 210 have different transmission characteristics for one or more of the primary light 103 and the composed light 104; wherein during operation of the system 1000 the optical filter system 200 is configured to have the segments 210 of the plurality of segments 210 sequentially intercept the main beam path 1105 or the second beam path 1102, wherein during a time period tsp the main beam path 1105 or the second beam path 1102 is partially intercepted by a first segment (A) and partially intercepted by a second segment (B). At time t1 only area A is intercepting the main beam path 1105 or the second beam path 1102, see light spot LS. At time t2 the area of first segment (A) which is intercepting the main beam path 1105 or the second beam path 1102 is larger than the area of second segment (B) which is intercepting the main beam path 1105 or the second beam path 1102, see light spot LS. At time t3 the area of first segment (A) which is intercepting the main beam path 1105 or the second beam path 1102 is equal to the area of second segment (B) which is intercepting the main beam path 1105 or the second beam path 1102, see light spot LS. At time t4 the area of first segment (A) which is intercepting the main beam path 1105 or the second beam path 1102 is smaller than the area of second segment (B) which is intercepting the main beam path 1105 or the second beam path 1102, see light spot LS. At time t5 only area B is intercepting the main beam path 1105 or the second beam path 1102, see light spot LS. Table 1 shows an example of different scenarios. In Scenario 1a the light spot LS comprises primary light 103 in t2, t3 and t4 e.g. the light spot LS may be switched on when LS impinges on B and may be switched off when LS does not impinge anymore on A. In Scenario 1b the light spot LS comprises primary light 103 in t1, t2, t3 and t4 e.g. the light spot LS may be switched on when LS does not yet impinge on B and may be switched off when LS does not impinge anymore on A. In Scenario 1c the light spot LS comprises primary light 103 in t2, t3, t4 and t5 e.g. the light spot LS may be switched on when LS impinges on B and may be switched off when LS does not impinge anymore on A for a certain time. In Scenario 1d the light spot LS comprises primary light 103 in t1, t2, t3, t4 and t5 e.g. the light spot LS may be switched on when LS does not yet impinge on B (i.e. the light spot LS is somewhere between a previous conventional spoke and the conventional spoke) and may be switched off when LS does not impinge anymore on A for a certain time (i.e. the light spot LS is somewhere between a the conventional spoke and a following conventional spoke). For example, the primary light may preferably be switched on in the range between half-way two conventional spokes (i.e. between a previous conventional spoke and the conventional spoke)

TABLE 1

| scenario | t1 | t2 | t3 | t4 | t5 |
|---|---|---|---|---|---|
| 1a | | 103 | 103 | 103 | |
| 1b | 103 | 103 | 103 | 103 | |
| 1c | | 103 | 103 | 103 | 103 |
| 1d | 103 | 103 | 103 | 103 | 103 |

Figure 8:
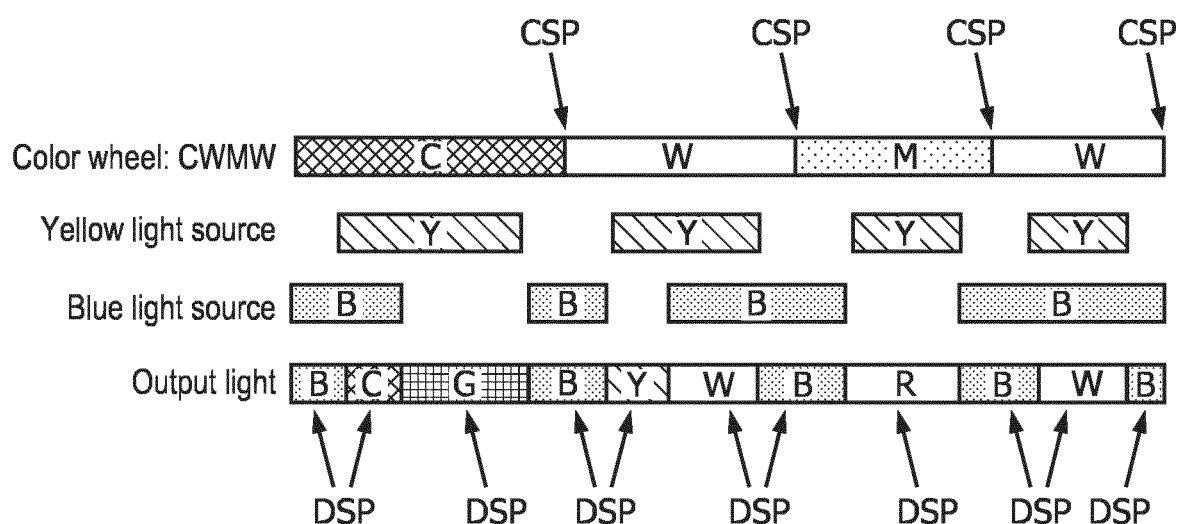
FIG. 8 schematically depicts an embodiment of the system.

FIG. 8 schematically depicts an example. In this example optical filtering system 200 e.g. a color wheel is used having a CWMW configuration. The color wheel is used in combination with a yellow light source Y and a blue light source B. The color wheel comprises real i.e. conventional spokes CSP. During these CSP the output color is stable blue light. Hereby there are no spoke light losses. Digital spokes DSP are done by switching the yellow light source and/or blue light source. The output light comprises sequentially the following colors: B-C-G-B-Y-W-B-R-B-W-B. It goes without saying that this driving scheme and color wheel is an example and thus different color wheels and/or driving schemes can be used.

In case of a system 1000 having a lighting arrangement 100 providing primary light 103 and no composed light 104 no beam combining optics e.g. dichroic optics are needed. For example, a UV or blue light source may be combined with a phosphor wheel. In case of a blue light, the phosphor wheel may comprise a section comprising a luminescent material and a section comprising no luminescent material e.g. a diffuser. The luminescent material may be a phosphor such as for example a yellow inorganic phosphor. In case of a UV light, the phosphor wheel may comprise a section with a blue phosphor and a section with a yellow phosphor.

In case of a system 1000 having a lighting arrangement 100 providing primary light 103 and composed light 104 beam combining optics e.g. dichroic optics are needed.

The term "plurality" refers to two or more.

The term "substantially" herein, such as in "substantially all light" or in "substantially consists", will be understood by the person skilled in the art. The term "substantially" may also include embodiments with "entirely", "completely", "all", etc. Hence, in embodiments the adjective substantially may also be removed. Where applicable, the term "substantially" may also relate to 90% or higher, such as 95% or higher, especially 99% or higher, even more especially 99.5% or higher, including 100%. The term "comprise" includes also embodiments wherein the term "comprises" means "consists of". The term "and/or" especially relates to one or more of the items mentioned before and after "and/or". For instance, a phrase "item 1 and/or item 2" and similar phrases may relate to one or more of item 1 and item 2. The term "comprising" may in an embodiment refer to "consisting of" but may in another embodiment also refer to "containing at least the defined species and optionally one or more other species".

Furthermore, the terms first, second, third and the like in the description and in the claims, are used for distinguishing between similar elements and not necessarily for describing a sequential or chronological order. It is to be understood that the terms so used are interchangeable under appropriate circumstances and that the embodiments of the invention described herein are capable of operation in other sequences than described or illustrated herein.

The devices herein are amongst others described during operation. As will be clear to the person skilled in the art, the invention is not limited to methods of operation or devices in operation.

It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting the claim. Use of the verb "to comprise" and its conjugations does not exclude the presence of elements or steps other than those stated in a claim. Unless the context clearly requires otherwise, throughout the description and the claims, the words "comprise", "comprising", and the like are to be construed in an inclusive sense as opposed to an exclusive or exhaustive sense; that is to say, in the sense of "including, but not limited to". The article "a" or "an" preceding an element does not exclude the presence of a plurality of such elements. The invention may be implemented by means of hardware comprising several distinct elements, and by means of a suitably programmed computer. In the device claim enumerating several means, several of these means may be embodied by one and the same item of hardware. The mere fact that certain measures are recited in mutually different dependent claims does not indicate that a combination of these measures cannot be used to advantage.

The invention further applies to a device comprising one or more of the characterizing features described in the description and/or shown in the attached drawings. The invention further pertains to a method or process comprising one or more of the characterizing features described in the description and/or shown in the attached drawings.

The various aspects discussed in this patent can be combined in order to provide additional advantages. Further, the person skilled in the art will understand that embodiments can be combined, and that also more than two embodiments can be combined. Furthermore, some of the features can form the basis for one or more divisional applications.

The invention claimed is:

1. A system for processing light, the system configured to provide along a main beam path a beam of system light, wherein the system light comprises one or more of first light having a first spectral distribution, second light having a second spectral distribution, and third light having a third spectral distribution, wherein the first, second, and third spectral distributions mutually differ, wherein first light is blue light, the second light is green light and the third light is red light, wherein the system comprises:

a lighting arrangement comprising one or more solid state light sources and configured to provide along a first beam path a first beam comprising primary light having a spectral power distribution with at least 80% of the spectral power consisting of the first light, and configured to provide along a second beam path a second beam comprising composed light having a spectral distribution with at least 80% of the spectral power consisting of the second light, and the third light;

wherein the lighting arrangement is configured to generate the first beam and the second beam at spatially separate positions, and wherein the system further comprises optics configured to combine at a beam path combination location the first beam path and the second beam path into the main beam path, or wherein the lighting arrangement is configured to generate the first beam and the second beam alternatingly;

an optical filter system comprising a plurality of segments, wherein two or more segments of the plurality of segments have different transmission characteristics for the composed light; wherein the two or more segments of the plurality of segments are transmissive for the primary light; wherein during operation of the system the optical filter system is configured to have the two or more segments of the plurality of segments sequentially intercept the main beam path, wherein during a time period (tsp) the main beam path is partially intercepted by a first segment and partially intercepted by a second segment to provide a substantial part of a spoke time of the system in which only light that is not filtered in the plurality of segments which alternatingly intercept the beam path;

a control system configured to control the lighting arrangement and the optical filter system such that during the time period (tsp) at least 80% of a spectral power distribution of the system light consists of the primary light and to create multiple sequences by varying duty cycle settings in the optical filter system.

2. The system according to claim 1, comprising (i) a first light source configured to generate primary light and (ii) a second light source configured to generate the composed light, wherein the second light source comprises a pump light source configured to generate pump light source light and a luminescent material configured to convert at least part of the pump light source light into luminescent material light, wherein the composed light comprises the luminescent material light, wherein the first light source comprises a solid state light source, and wherein the second light source comprises a solid state light source.

3. The system according to claim 2, wherein the control system is configured to have the system provide the first beam comprising primary light during a first part of the time period (tsp) and not to provide the second beam of the composed light during the same first part of the time period (tsp).

4. The system according to claim 1, wherein during operation system light of the beam of system light may comprise simultaneously or sequentially the primary light and the composed light, and wherein the lighting arrangement comprises one or more solid state light sources for generating one or more of the first light, the second light, and the third light, optionally with the use of one or more luminescent materials.

5. The system according to claim 1, wherein the optical filter system is configured to have the segments of the plurality of segments sequentially intercept the main beam path downstream of the beam path combination location.

6. The system according to claim 5, wherein two or more segments have different transmission characteristics for one or more of the first light, the second light and the third light, with at least a first segment being transmissive for the primary light and being transmissive for at least one of the two others of the first light, the second light, and the third light, and a second segment being transmissive for the primary light and at least the other of the one of the two others of the first light, the second light, and the third light.

7. The system according to claim 5, wherein both the first segment and the second segment are transmissive for the primary light, wherein the primary light comprises the first light and wherein the first light comprises blue light, and wherein the first segment has a higher transmission for the second than for the third light and wherein the second segment has a higher transmission for the third light than for the second light, wherein the second light comprises green light, and wherein the third light comprises red light.

8. The system according to claim 1, wherein the optical filter system is configured to have the segments of the plurality of segments sequentially intercept the second beam path upstream of the beam path combination location.

9. The system according to claim 8, wherein the composed light has the spectral distribution with at least 80% of the spectral power consisting of the two others of the first light, the second light, and the third light, wherein two or more segments have different transmission characteristics for these two others, with at least a first segment being transmissive for one of the two others, and a second segment being transmissive for the other of the two others.

10. The system according to claim 8, wherein the first segment has a higher transmission for the second than for the third light and wherein the second segment has a higher transmission for the third light than for the second light, wherein the second light comprises green light, and wherein the third light comprises red light.

11. The system according to claim 1, wherein the optics configured to combine at the beam path combination location the first beam path and the second beam path into the main beam path comprises a dichroic mirror.

12. The system according to claim 1, wherein the optical filter system comprising rotatable element comprising the plurality of segments, and a rotator configured to rotate the rotatable element for having the plurality of segments sequentially intercept the main beam path or the second beam path.

13. A projection system or a luminaire comprising the system according to claim 1.

14. A method for processing light with a system comprising one or more solid state light sources and configured to provide along a main beam path a beam of system light, wherein the system light comprises one or more of first light having a first spectral distribution, second light having a second spectral distribution, and third light having a third spectral distribution, wherein the first, second, and third spectral distributions mutually differ, wherein first light is blue light, the second light is green light and the third light is red light, wherein the method comprises:
providing along a first beam path a first beam comprising primary light having a spectral power distribution with at least 80% of the spectral power consisting of the first light and providing along a second beam path a second beam comprising composed light having a spectral distribution with at least 80% of the spectral power consisting of the second light, and the third light;
wherein the lighting arrangement is configured to generate the first beam and the second beam at spatially separate positions, and wherein the system further comprises optics configured to combine at a beam path combination location the first beam path and the second beam path into the main beam path, or wherein the lighting arrangement is configured to generate the first beam and the second beam alternatingly;
sequentially intercepting the main beam path, wherein during a time period (tsp) the main beam path) is partially intercepted by a first segment of an optical filter system and partially intercepted by a second segment of the optical filter system, wherein the first segment and the second segment have different transmission characteristics for the composed light, and wherein the first segment and the second segment are especially transmissive for the primary light to provide a substantial part of a spoke time of the system in which only light that is not filtered in the plurality of segments which alternatingly intercept the beam path; and
controlling the system light of the beam of system light such that during the time period (tsp) at least 80% of a spectral power distribution of the system light consists of the primary light and to create multiple sequences by varying duty cycle settings in the optical filter system.

* * * * *